US010795775B2

(12) United States Patent
Gibbons, Jr. et al.

(10) Patent No.: US 10,795,775 B2
(45) Date of Patent: Oct. 6, 2020

(54) APPARATUSES, METHODS, AND SYSTEMS FOR STORAGE AND ANALYSIS OF SAAS DATA AND NON-SAAS DATA FOR BUSINESSES AND OTHER ORGANIZATIONS

(71) Applicant: Datto, Inc., Norwalk, CT (US)

(72) Inventors: Robert John Gibbons, Jr., Norwalk, CT (US); Austin McChord, Norwalk, CT (US)

(73) Assignee: DATTO, INC., Norwalk, CT (US)

( * ) Notice: Subject to any disclaimer, the term of this patent is extended or adjusted under 35 U.S.C. 154(b) by 337 days.

(21) Appl. No.: 15/771,443

(22) PCT Filed: Oct. 31, 2016

(86) PCT No.: PCT/US2016/059731
§ 371 (c)(1),
(2) Date: Apr. 27, 2018

(87) PCT Pub. No.: WO2017/075594
PCT Pub. Date: May 4, 2017

(65) Prior Publication Data
US 2018/0314603 A1    Nov. 1, 2018

Related U.S. Application Data

(60) Provisional application No. 62/248,099, filed on Oct. 29, 2015.

(51) Int. Cl.
*G06F 11/14* (2006.01)
*G06F 16/27* (2019.01)
(Continued)

(52) U.S. Cl.
CPC ............ *G06F 11/1464* (2013.01); *G06F 7/00* (2013.01); *G06F 16/258* (2019.01); *G06F 16/27* (2019.01);
(Continued)

(58) Field of Classification Search
CPC .... G06F 16/27; G06F 16/258; G06F 11/1464; H04L 63/0428; H04L 63/083
(Continued)

(56) References Cited

U.S. PATENT DOCUMENTS

| | | | |
|---|---|---|---|
| 9,235,547 B1 * | 1/2016 | Hartman, II | H04L 51/14 |
| 2007/0100913 A1 * | 5/2007 | Sumner | G06F 21/6227 |
| 2010/0332456 A1 | 12/2010 | Prahlad et al. | |
| 2011/0145836 A1 | 6/2011 | Wheeler et al. | |
| 2011/0246732 A1 * | 10/2011 | Amano | G06F 11/1464 |
| | | | 711/162 |

(Continued)

OTHER PUBLICATIONS

International Search Report and Written Opinion for International Patent Application No. PCT/US16/59731 dated Jan. 19, 2017 (11 pages).

*Primary Examiner* — Dung K Chau
(74) *Attorney, Agent, or Firm* — Fay Sharpe LLP

(57) ABSTRACT

A "Local Ingestion" (LI) Server resides and operates in the LAN of a business organization, and provides backup storage for data generated using various software applications locally installed on client terminals ("non-SaaS data") and data generated using various SaaS applications accessed by client terminals via the Internet ("SaaS data"). The LI Server can receive data generated in a native format by either a local non-SaaS application or one or more SaaS applications and convert from different native data formats to an application platform-independent or "canonical" format for backed-up SaaS data and non-SaaS data. The LI Server may then analyze data generated using different source applications, and backed-up in a canonical format, so as to identify particular content, patterns, relationships, and/or trends and thereby extract valuable business-related or other information from multiple cross-platform files.

22 Claims, 18 Drawing Sheets

(51) Int. Cl.
*G06F 16/25* (2019.01)
*H04L 29/08* (2006.01)
*H04L 29/06* (2006.01)
*G06F 7/00* (2006.01)
*G06Q 10/10* (2012.01)

(52) U.S. Cl.
CPC ......... *G06Q 10/10* (2013.01); *H04L 63/0428* (2013.01); *H04L 63/083* (2013.01); *H04L 67/1097* (2013.01)

(58) Field of Classification Search
USPC .......................................................... 707/610
See application file for complete search history.

(56) References Cited

U.S. PATENT DOCUMENTS

| | | | |
|---|---|---|---|
| 2012/0185913 A1* | 7/2012 | Martinez | G06F 9/45558 726/1 |
| 2014/0081911 A1* | 3/2014 | Deshpande | G06F 3/067 707/610 |
| 2014/0108793 A1* | 4/2014 | Barton | G06F 21/60 713/165 |
| 2015/0135287 A1 | 5/2015 | Medeiros et al. | |
| 2015/0281355 A1 | 10/2015 | Maturana et al. | |
| 2015/0304306 A1* | 10/2015 | Ponsford | G06F 21/6218 713/171 |

* cited by examiner

APPARATUSES, METHODS, AND SYSTEMS FOR STORAGE AND ANALYSIS OF SAAS DATA AND NON-SAAS DATA FOR BUSINESSES AND OTHER ORGANIZATIONS

CROSS-REFERENCE TO RELATED APPLICATIONS

The present application is a national stage application of International Application No. PCT/US2016/059731 entitled "APPARATUSES, METHODS, AND SYSTEMS FOR FACILITATING REVERSE ROUNDTRIP TRANSMISSIONS OF STORAGE DATA,", filed on Oct. 31, 2016, which claims priority to U.S. provisional application Ser. No. 62/248,099, filed Oct. 29, 2015, the disclosures of each of which are hereby incorporated by reference in their entirety.

BACKGROUND

Many businesses and other organizations operate out of office buildings that have floor space to host (1) computing devices (e.g., personal computing devices such as a desktop computer, laptop computers, and other suitable computer devces), referred to herein as clients or client terminals, and (2) employees who use these client terminals. Client terminals that are "local" to each other (e.g., in physical proximity as a result of belonging to the same office building) can be connected to each other via a private network, such as a Local Area Network (LAN). The private network can be connected to other networks (e.g., a network provided by an Internet Service Provider) to enable each client terminal to access the Internet, for example, using a web browser.

Client terminals generally include locally installed software that allows employees to generate data useful to their business(es). For example, a desktop computer can be installed with word processing software that allows employees to generate text files. In another example, a laptop computer can be installed with email composition software that allows employees to generate email messages. Data generated at one client terminal (e.g., text files, email messages) can be transferred to other computer devices belonging to the same network (e.g., other client terminals).

More recently, many businesses have begun to subscribe to Software as a Service (SaaS), which can allow users (e.g., employees), to use software "on demand" not locally installed on their respective client terminals. Under the SaaS model, software (a "SaaS application" or "SaaS app") is typically installed on a SaaS application server rather than installed on a user client terminal (e.g., a desktop computer located on business premises), and licensed to a business on a subscription basis or per-use basis. In other words, typically the SaaS application is installed on a server that is physically remote from the user and any private network on which a user's client terminal resides. For example, a user (and her client terminal) could be in California while the SaaS application server could be in Connecticut. Accordingly, an employee can access a SaaS application installed on a SaaS application server, for example, via her client terminal's web browser, provided that the business has a valid subscription and the employee's client terminal has Internet access.

Like locally installed software, SaaS applications can enable employees to generate data useful to their businesses. For example, a word processing SaaS application can allow users to generate text documents via a web browser (with Internet access). For another example, a customer relationship management (CRM) SaaS application can allow employees to generate data related to a business's customers. Typically, a user inputs information through a client terminal (e.g., text input) and the client terminal transmits that information via the Internet to the SaaS application server, where the information can be stored (e.g., as a text file), perhaps after undergoing additional processing at the SaaS application server.

In many instances, a business will turn to SaaS providers for software with new functionalities. Because many SaaS applications require only a web browser with Internet access, doing so may allow the business to save on IT infrastructure costs, including the cost of software maintenance (e.g., the purchase and installation of newer versions of previously acquired software) and the cost of hardware upgrades (e.g., new functionality may require a faster processor).

SUMMARY

The inventors have recognized that the continued use of traditional, locally installed software and the more recent and increasing use of SaaS applications can lead to fragmentation of data, in which the aggregated data of a business or organization is separated and dispersed among one or more SaaS servers and other private storage servers. This fragmentation of data can be logical in nature, as a result of different portions of data being generated from different software applications. The separation can also be physical in nature, as a result of different portions of data being generated and/or stored at different physical locations. The logical and physical separation of such data presents multiple technical problems, including but not limited to (1) increased vulnerability to network communications problems, (2) data divergence, (3) increased difficulty in ensuring compliance with data access and storage protocols (e.g., privacy and data security protocols), and (4) potential exposure of data to loss, theft, or undesired public disclosure.

The inventors have also recognized and appreciated that a wide variety of proprietary data formats, for both SaaS applications and non-SaaS applications, presents challenges for holistically indexing and/or interrogating a business or other organization's data for particular content, patterns or relationships, trends, and the like. Further, for a given SaaS application or non-SaaS application, proprietary data formats may change over time (e.g., as a result of application revisions, updates to address bugs, etc.). As a result, such proprietary format changes may give rise to incompatibilities or inconsistencies with respect to similar data that is periodically backed-up from a given application over time (e.g., backup data for a file generated by version 1.3 of a particular application may have a different metadata format and/or content, and/or may not be compatible with, version 2.4 of the same application).

In view of the foregoing, inventive embodiments disclosed herein relate to apparatuses, methods, and systems for addressing issues relating to the physical and/or logical separation of business data that is created in part by one or more SaaS applications residing and operating outside of the LAN of a business or other organization, and in part by one or more non-SaaS applications residing and operating within the LAN of the business or other organization, as well as issues relating to the variety of proprietary native formats for data generated by SaaS applications and non-SaaS applications.

One example inventive implementation includes a "Local Ingestion" (LI) Server which resides and operates in the LAN of a business organization, and provides backup storage for both (1) data generated using various software applications locally installed on client terminals ("non-SaaS data") and (2) data generated using various SaaS applications accessed by client terminals via the Internet ("SaaS data"). The LI Server can receive data generated in a native format by either software installed on client terminals (a "local non-SaaS application") or one or more SaaS applications, i.e., the format of data as it was first generated by a corresponding SaaS application or a local non-SaaS application. The LI Server can also receive (e.g., be installed with) software configured to holistically analyze data generated using different source applications (e.g., local non-SaaS applications or SaaS applications) so as to identify patterns and thereby extract business related information. In some instances, the respective native formats of the data generated by one or more SaaS applications and one or more non-SaaS applications can be converted (e.g., from different native formats to an application platform-independent or "canonical" format) prior to analysis to facilitate the extraction of information.

All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. The terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings are primarily for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Figure 1A:
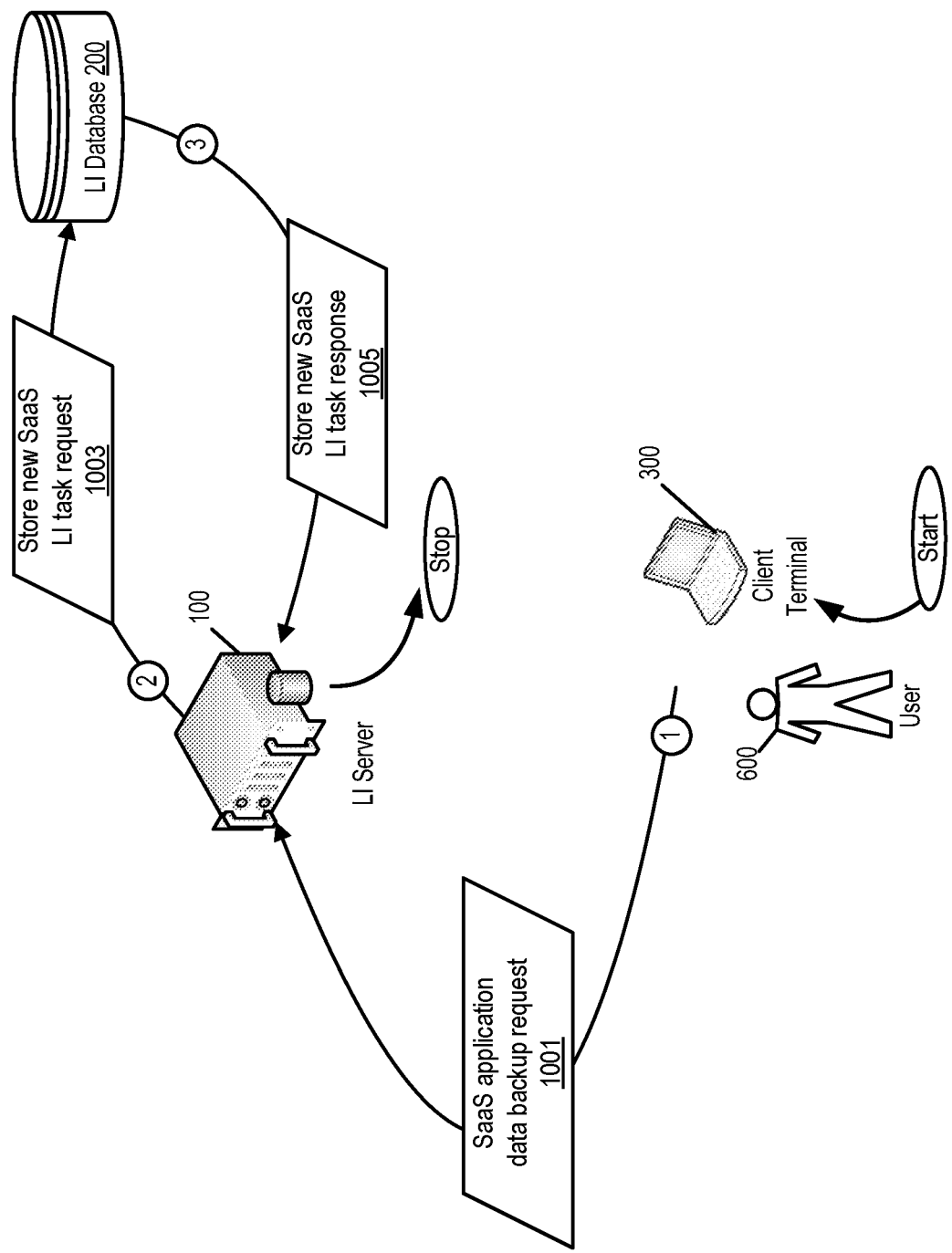
FIGS. 1A-1B illustrate an example data flow to schedule an ingestion of SaaS data by a Local Ingestion (LI) server, according to inventive aspects of the present disclosure.

In some embodiments, APPARATUSES, METHODS, AND SYSTEMS FOR CREATION OF LOCAL SAAS APPLICATION DATA ANALYSIS ENVIRONMENTS include hardware and methods of using hardware to store and analyze data. Exemplary hardware includes a Local Ingestion Server ("LI Server") that can be coupled to (1) a non-public or private network for receiving data and/or executable software from local client terminals and (2) a public network for receiving data from SaaS application servers and/or cloud storage servers. The LI Server can be equipped with hardware and software that enables periodic and/or on-demand synchronization of content between local client terminals, SaaS application servers, and/or cloud storage servers, such that current or recent versions of data can be backed up from local client terminals, SaaS application servers, and/or cloud storage servers when desired. The LI Server can also store multiple versions of backup data, each version of backup data corresponding to a state of data stored at a SaaS application server, a cloud storage server, and/or a client terminal at a particular point in time.

In operation, an LI Server stores one or more backup copies of data generated through SaaS applications and/or software locally installed in client terminals so as to reduce the likelihood of data lost in the event that an original copy is deleted. In some instances, the LI Server is physically separate and/or distantly located from a device storing the original copy of the data (e.g., the client terminal or the SaaS application server) in order to mitigate the risk that a local event would affect both the LI Server and the device that stores the original data. If the device that holds the original copy were to malfunction, for example, due to a natural disaster or technical problem, the backup copies stored in the LI Server can remain intact and accessible.

The LI Server can additionally provide software and hardware components to mine data generated by and/or received from different sources to identify and/or infer information patterns based on historical records captured from one or more SaaS applications and/or one or more non-SaaS applications.

Glossary

API or Script Tree Structure: A hierarchical tree structure that can be represented recursively as a collection of nodes (starting at a root node), where each node is a data structure including one or more Endpoints, a set of applicable scripts and/or Application Programming Interface (API) calls or routines, and a list of references to children nodes. For example, a parent node can include the Endpoint http://api.dbox.com/users or, for simplicity, just "users." At the "users" Endpoint, one or more API calls or routines can be executed, for example, an API call or routine to retrieve an account information of a user with an specific identification number, or to return a set of users with a common characteristic (for example, "all access rights" users).

Application Data Scheme: A set of rules describing a systematic arrangement to interpret data. An Application Data Scheme can include rules to convert native data into a high-fidelity format (e.g., representational state transfer or REST format), such that the data can be viewed, transferred between entities with no data lost, combined with data from another data source or application, and backed up and restored to a native format. The Application Data Scheme can be utilized to interpret data from a designated SaaS or non-SaaS application and to generate a file in a response knowledge format and/or High Fidelity Format. Moreover, an Application Data Scheme can contain equivalency rules indicating content equivalences between SaaS and/or Non-SaaS application data. An Application Data Scheme can further include rules to convert data to different SaaS and Non-SaaS application formats, irrespective of the original format in which the data was generated.

Backup Definition: A set of scripts and/or files that enable the interaction of a third-party system with a SaaS and Non-SaaS application. A Backup Definition can include one or more API or Script Tree Structures; a collection of applications' Endpoints; Script Snippets to receive, transmit and/or update data in an application; computer executable instructions to perform Variable Mappings; and one or more Application Data Schemes.

Backup Instance: The object which represents a customer or user's backup, as generated via a Backup Definition (e.g., "Matt's Dropbox backup" or "Company X Salesforce account").

Customer/User: A regular user who directly or indirectly utilizes Backup Definitions to back up data.

Endpoint: Defines a single part of a remote API via an address and/or connection point to a web service, e.g. http://api.dbox.com/users or http://api.dbox.com/folders or http://api.dbox.com/files. An Endpoint provides the service mechanics, for example, GET, PUT, POST and DELETE routines, for the exchange and update of SaaS data and/or Non-SaaS data.

High-Fidelity Format: A data format containing data, information and metadata describing how data is represented in the native data format utilized by an application. A dataset expressed in High-Fidelity Format includes an application platform-independent representation of SaaS and Non-SaaS data and can be converted back into a native format and exported to other SaaS and non-SaaS applications. A High Fidelity Format can be expressed in parts or as a whole in, for example, Extensible Markup Language (XML) format, Comma Separated Values (CSV) format, JavaScript Object Notation (JSON) and the like formats.

Index: a systematic guide of text terms designed to indicate topics or features of documents in order to facilitate retrieval of documents or parts of documents. Indexes include the following major components: (a) text terms representing the topics or features of documentary units; (b) a syntax for combining terms into headings (in displayed indexes) or search statements (in non-displayed indexes) in order to represent compound or complex topics, features, and/or queries; (c) cross-references or other linking devices among synonymous, equivalent, broader, narrower, and other related terms; (d) a procedure for linking headings (in displayed indexes) or search statements (in non-displayed indexes) with particular documentary units or document surrogates; and (e) a systematic ordering of headings (in displayed indexes) or a search procedure (in non-displayed indexes).

Script Snippet: A piece of scripting language expressed in, for example, Javascript, Visual Basic Scripting Edition (VBscript), Tool Command Language (TCL) and the like languages. A script snippet can be supplied at the Backup Definition level, for example, to retrieve data from a specific Endpoint. The LI Server can execute a script snippet at well-defined Endpoints in the backup/restore lifecycle to manage and monitor responses, for example, Representational State Transfer (REST) responses.

Variable Declaration: One or more computer executable instructions to define variables utilized in a Backup Definition to customize the effects of backup and restoration operations. In some instances the values provided in a Variable Declaration can be supplied by a Customer/User, or can be stored in and retrieved from an LI Server.

Variable Mapping: A way to setup groups of Variable Declarations used for a special purpose by the system, for example to provide secure delegate access through Open Standard Authorizations (OAuth) or add stock headers or parameters to requests.

Variable Value: A value generally entered by Customers/Users and/or retrieved from an LI Server, utilized to supply value(s) for a Variable Declaration to, for example, generate a Backup Instance and/or to perform a connectivity task.

Vendor: An entity that owns and provides Backup Definitions to third parties and/or LI servers. A vendor can be implemented as a computer server owned by a user, company and/or organization.

Trigger Fields: Fields that are used with an API routine to fetch or retrieve specific data via an Endpoint; for example, "GET/#account_id/triggers/#trigger_id/mailings" returns the emails sent by the trigger corresponding to the value in the variable "#trigger_id".

Technical Problems Associated with Backing Up SaaS Data

Generally, data generated using a SaaS application (e.g., that is accessed via a client terminal in a LAN) is not stored locally in the LAN, but is stored in the "cloud." In other words, the data is stored at a server that can be accessed by a client terminal (e.g., located on business premises in the LAN) through the Internet. In some instances, the server that stores the generated data can be the same device as the SaaS application server (at which the SaaS application is installed). In other instances, the server that stores the generated data can be a different device. For example, a word processing SaaS application can be hosted at a SaaS application server located in Boston, while a text document generated using the word processing SaaS application can be stored at a server located in San Francisco.

A similar situation of "physical separation" can exist between original data files and backup files of the original data files. For example, text documents generated using word processing software on a desktop computer, and stored on the desktop computer, can be backed up on a USB memory drive that is kept in the same desk that holds the desktop computer. On a larger scale, in another example, backup copies of email messages generated using email composition software installed on desktop computers located in an office building can be stored at a dedicated backup device located in the same office building and connected to the desktop computers via a LAN.

The backing up of SaaS data can give rise to more complex situations of physically and logically separated original data files and backup data files. To illustrate, consider again the scenario above, in which a user at a client terminal is located in a business LAN in Florida, and creates a text document using a SaaS application hosted at a SaaS application server located in Boston. In turn, the SaaS application may store this text document at a server located in San Francisco (i.e., the original data for the text file is stored in San Francisco). Now consider that the business in Florida may also contract with an IT management/data backup business that operates a backup storage server farm in Iowa, such that one or more backup copies of this text document may be stored at a "farm" of cloud storage servers in Iowa (i.e., original data for text file stored in San Francisco, backup copies stored in Iowa).

Thus, the continued use of locally installed software in a business LAN, coupled with the use of SaaS applications by users in the business LAN, has given rise to situations where some portions of data generated by a business, as well as backup copies of the data, can be stored locally (e.g., in the same office building as the client terminals) while other portions of the data and/or backup data can be stored in the "cloud" (e.g., at a server farm in a remote location). Furthermore, data stored in the "cloud" may be physically dispersed among several locations owing to the increasing number of SaaS applications.

Accordingly, respective portions of the aggregate data generated by a user, business and/or organization can be separated and dispersed not only logically, as a result of being generated using different software applications, but also spatially or physically, as a result of being generated and/or stored at different geographic locations. The logical and physical separation of business data—both original data and backup data—presents several technical problems, including but not limited to (1) increased vulnerability to network communications problems and (2) data divergence. For example, communication problems, such as routing problems, may hinder transferring data between different ones of a backup data storage site, the SaaS server, and the client terminal. And if a backup schedule for the SaaS data differs from a backup schedule for other non-SaaS business data, including data generated using locally installed software, then the backup copies of the SaaS data (for instance, SaaS data generated with different SaaS applications) and any related or associated data generated locally may diverge.

In addition, as noted above, data generated during use of a SaaS application may be stored by a party other than the SaaS provider, which can create further technical problems, including increased difficulty in ensuring compliance with data storage policies of the SaaS subscriber and/or an increased risk of undesired exposure of sensitive or proprietary data to third parties. For example, if the SaaS provider contracts with a third party to store the SaaS data, then the third party may effectively assume responsibility for safeguarding the SaaS data, possibly unbeknownst to the SaaS subscriber or user responsible for generating the SaaS data. As a result, the SaaS subscriber may be unable to ensure that access to and/or storage of the SaaS data meets the appropriate compliance guidelines (e.g., HIPAA guidelines for medical records). And if the third party fails to store the SaaS data with the appropriate safeguards in place, the SaaS data may be vulnerable to loss, theft, public disclosure, etc., for example, due to accident or hacking.

In view of the foregoing, backing up SaaS data to an LI Server according to the inventive concepts described herein significantly reduces problems associated with accessing and securing SaaS data. In some instances, connecting the LI Server directly to the client terminal or to the client terminal's network (e.g., LAN) eliminates the need to store SaaS backup data in a cloud-based server, avoiding potentially troublesome network connections and security risks. Storing both SaaS data and locally generated data in the LI Server allows the user to specify a desired data backup policy, such as a backup policy that involves backing up both SaaS data and locally generated data at the same time to reduce the possibility of divergence. Being able to specify and enforce a particular backup policy for SaaS data (e.g., with an LI Server) may also allow improved compliance with data access and security guidelines, and reduce vulnerability to data loss, theft, inadvertent public disclosure, and the like.

Additionally, the LI Server can be placed "locally" with respect to the client terminals, in the sense that the LI Server and the client terminals can communicate and transfer files with each other via the business LAN without having to use a public network (e.g., the Internet). In some instances, the "local" nature of the LI Server ensures that certain sensitive backup data generated by the client terminals does not necessarily have to be stored on a server external to the LAN that must be accessed via a connection to a public network, where the likelihood of information theft increases as a result of decreased security. Similarly, an LI server connected to the LAN can be configured with software to analyze data holistically, and any additional data generated as a result of this process need not be stored, executed, or transferred outside the LAN, so as to substantially reduce a risk or undesired disclosure of valuable or sensitive information (e.g., proprietary source code, and analytics, and any data used by or arising therefrom).

Advantages of Backing Up SaaS Data on an LI Server

By locally storing, via various implementations of an LI Server as disclosed herein, both non-SaaS data generated via local applications in a business LAN, as well as SaaS data generated by external SaaS applications accessed from within the LAN—and also storing backups of both non-SaaS data and SaaS data on the LI Server—a number of unexpected advantages are realized. In particular, non-SaaS data and SaaS data, generated by multiple respective local applications and/or external SaaS applications, may be holistically analyzed to reveal potential patterns that constitute valuable information.

For example, a retailer may conventionally store customer address data locally (including backups), but may store other customer data (e.g., customer order histories) remotely in the cloud. In this scenario, the retailer may be unable to mine both sets of data as a whole to identify useful information. To illustrate, consider a situation in which customer address data and the order history data, when viewed together, may indicate that a particular item, for example item A, as revealed by order history data, has been popular among customers of a particular region, as revealed by customer address data. A retailer that is aware of this information may wish to increase its advertising activity for items that are similar to item A in the particular region where it is popular.

As noted above, an LI Server according to the inventive concepts disclosed herein significantly mitigates issues arising from the spatial and logical separation between portions of data by providing backup storage for both (1) non-SaaS data generated using various software installed on client terminals in a LAN, and (2) data generated using various SaaS applications accessed by client terminals in the LAN via the Internet. The LI Server can receive data generated using (1) software installed on the client terminals and (2) SaaS applications in their native formats, i.e., the format of data as it was first generated by the relevant SaaS software or application. The LI Server can also receive (e.g., be installed with) software configured to analyze data generated at different sources (e.g., local client terminals, SaaS application server) holistically to identify patterns and thereby extract potentially valuable information. In some instances, as discussed further below, the format of the received data can be converted (e.g., from native format to a different format) prior to analysis to facilitate the extraction of information.

In other aspects, the LI Server also gives users confidence to use one or more SaaS applications without having to worry about the competence or reliability of a given SaaS provider's backup policy and potential loss of data. Certain SaaS applications, for example new SaaS applications, can be prone to failure, which causes potentially valuable data to be lost. To mitigate or eliminate this problem, the LI Server can periodically receive and store data generated through the use of any number of SaaS applications as backed-up SaaS data, thereby creating restore points in time from which users can recover SaaS data.

In instances where the LI Server is located near the client terminals (e.g., the LI Server and the client terminals are in the same office building), the physical proximity of the LI Server can give a business and its Information Technology (IT) professional(s) or system administrator(s) psychological comfort by knowing that valuable and sensitive data is safe and within reach.

Example Implementation: SaaS Data Backup by an LI Server

FIG. 1A illustrates an example data flow to schedule the ingestion of SaaS data by a Local Ingestion (LI) server 100, according to one implementation of the inventive concepts disclosed herein. The LI server 100 can enable a user 600 in communication with a client terminal 300 to schedule backups of SaaS data as a one-time event and/or as a recurring event. The user 600 can configure, through the terminal 300, a request to perform a SaaS application data backup. Once the request to perform a SaaS application data backup is configured, the user 300 can send the request 1001 to the LI server 100.

An example of content comprised in a SaaS application data backup request 1001, substantially in the form of an HTTP(S) POST message including XML-formatted data, is provided below:

```
1.  POST /SaaS_application_backup_request.php HTTP/1.1
2.  Host: www.LI_Server.com
3.  Content-Type: Application/XML
4.  Content-Length: 667
5.  <?XML version = "1.0" encoding = "UTF-8"?>
6.  <SAB_request>
7.      <timestamp>2020-12-12 15:00:00</timestamp>
8.      <device_ID>2027</device_ID>
9.      <client_terminal_credentials>
10.             <password>secretpass1234</password>
11. <private_ key>j341engi648et456#@hnnengywrksxbi</private_key>
12.         </client_terminal_credentials>
13.         <user_credentials>
14.             <client_name>John Doe</client_name>
15.             <client_password>904aA409</client_password>
16.         </user_credentials>
17.         <backup_info>
18.             <scheduled_time>Mon@20:00</scheduled_time>
19.             <backup_period>recurrent</backup_period>
20.             <SaaS_App_info>
21.                 <SaaS_name>Dbox</SaaS_name>
        <SaaS_BUPDefinition_Vendor>BUPf_labs</SaaS_BUPDefinition_Vendor>
22.                 <SaaS_user_name>JDoe</SaaS_user_name>
23.                 <SaaS_user_password>J34f&9D</SaaS_user_password>
24.                 <SaaS_server_URL>
        http://cs2.Dbox.com/servlet/servlet.Download?file=00PR0000000MqVH</SaaS_server_URL>
25.             </SaaS_App_info>
26.             <SaaS_select_fields>
27.                 <AuthorID>JD19810</AuthorID>
28.                 <FolderID>Clients_Accounts</FolderID>
29.             </SaaS_select_fields>
30.             <SaaS_backup_fields>
31.                 <name>TRUE</name>
32.                 <body>TRUE</body>
33.                 <keywords>TRUE</keywords>
```

```
34.              <description>True</description>
35.              <LastReferencedDate>FALSE</LastReferenceDate>
36.              <LastViewedDate>FALSE</LastViewedDate>
37.              <URL>FALSE</URL>
38.              .
39.              .
40.              .
41.           </SaaS_backup_fields>
42.        </backup_info>
43.     </SAB_request>
```

As shown in the XML structure above, a SaaS application data backup request 1001 can include the following fields:

63.1. a timestamp indicating the date and/or time the request was sent by the client terminal 300;

63.2. a device identifier to uniquely identify the client terminal originating the request;

63.3. client terminal credentials (e.g., password and/or private key) to verify, for example, if the client terminal has the appropriate permissions to originate a SaaS application data backup request;

63.4. user credentials (e.g., user name and/or password) to verify, for example, if the user has the appropriate permissions to schedule a SaaS application data backup request;

63.5. a scheduled time indicating the date and/or time the SaaS application data backup is to be performed;

63.6. a backup period indicating, for example, if the backup is to be a one-time event, or if it is to be performed recurrently for a specified period of time (e.g., the following six months), or if it is to be performed indefinitely;

63.7. SaaS application information including, for example, SaaS name, the name of a SaaS Backup Definition Vendor, SaaS subscriber or user credentials, and SaaS server URL, to enable the LI Server to access the SaaS application;

63.8. SaaS selected fields that can be used to specify which SaaS data should be backed up by the LI Server (e.g., an AuthorID field to indicate that only data authored by a specific user need be backed up, a FolderID field to indicate that only data within a specific folder need be backed up); and 63.9. SaaS backup fields to indicate particular data or a dataset from a SaaS file or document to be backed up (e.g., back up only the document name, body, keywords, or description, or any combination of the foregoing).

In some instances, a user can specify certain fields contained within the SaaS application data backup request 1001, for example, through a user interface presented via the client terminal 300. A user may specify that she wishes to back up the document name, body, keywords, and description, but not LastReferenceDate and LastViewDate. In this case, the SaaS application backup request 1001 would be configured such that the document name, body, keywords, and description fields are marked "TRUE," while the LastReferenceDate and LastViewDate fields are marked "FALSE."

Upon receiving a SaaS application data backup request 1001, the LI Server 100 can send a Store new SaaS LI tasks request 1003 to an LI Database 200 (as discussed further below in connection with FIG. 14, the LI Database 200 may be resident in one or more physical storage devices of the LI Server). The Store new SaaS LI tasks request 1003 causes the LI Database 200 to store the SaaS application data backup request 1001, and can be made, for example, by an "INSERT INTO" statement in Standardized Query Language (SQL). After storing the SaaS application data backup request 1001, the LI Database 200 can confirm that the SaaS application data backup request 1001 has been successfully stored by sending a Store new SaaS LI tasks response 1005 back to the LI Server 100. It should be appreciated that in the implementation of FIG. 1a, the LI Database 200 stores all information necessary to access a SaaS application's data, including any credentials (e.g., associated with a user and/or client terminal) required to authorize access.

Figure 1B:
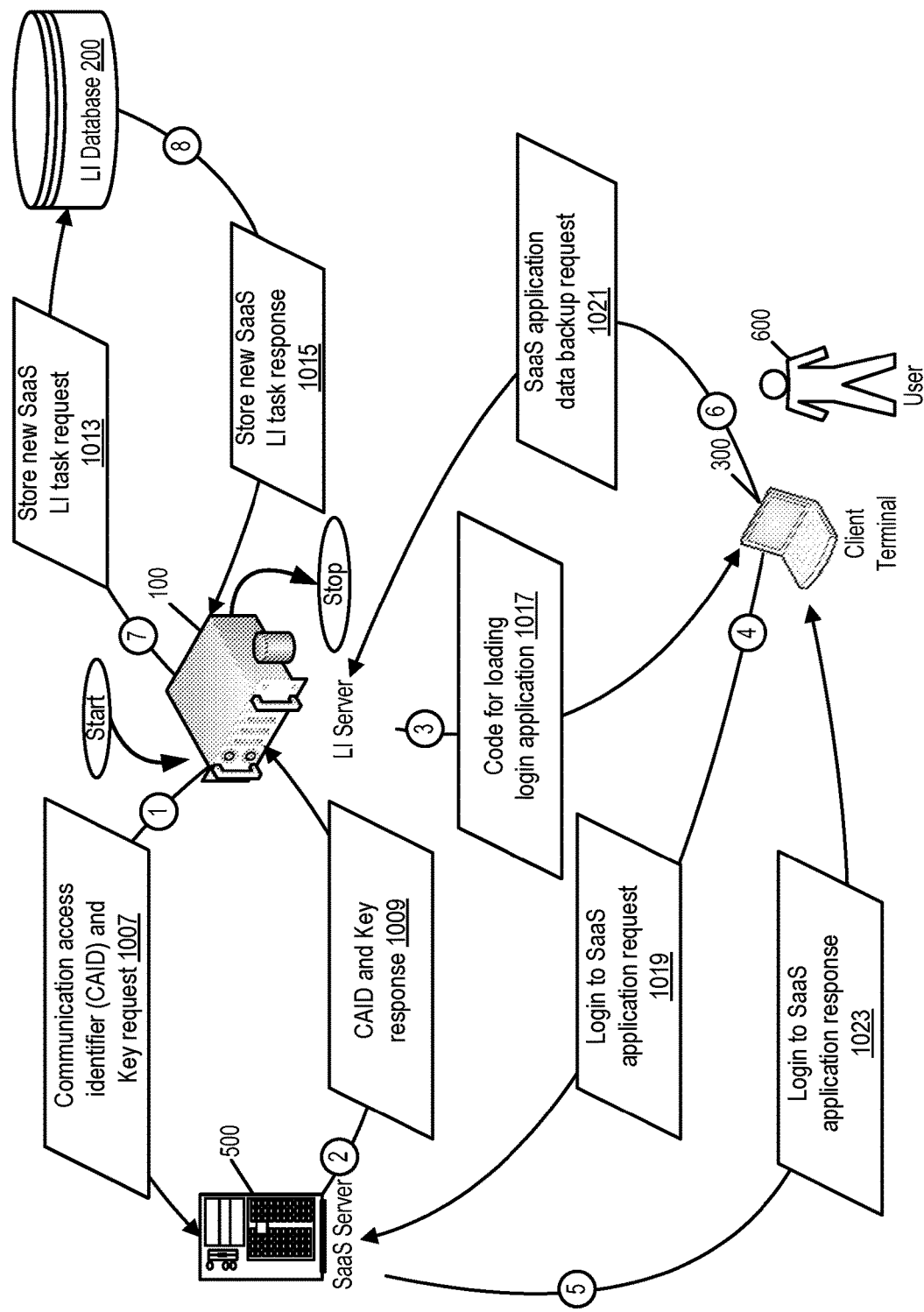

FIG. 1B illustrates another example data flow to schedule an ingestion of SaaS data by a LI Server 100, according to one implementation of the inventive concepts disclosed herein. In FIG. 1B, the user 600 in communication with the client terminal 300 can schedule a SaaS application data backup request without providing her personal authentication credentials to the LI Server 100 (as is the case in the implementation of FIG. 1A). Instead, the client terminal 300 can display a web application hosted by the LI server having a login application to establish connections directly between the user and one or more SaaS service providers (e.g., SaaS Server 500). Therefore, the user 600 can provide her login credentials directly to the SaaS Server 500 (and in this way avoid the need to store her credentials in the LI Database 200) via a direct connection between the user 600 and the SaaS Server 500 established through a web application hosted by the LI Server 100.

To this end, in the implementation of FIG. 1B, the LI server 100 can send a communication access identifier (CAID) and key request 1007 to the SaaS server 500. A communication access identifier and key are unique fields that the SaaS server 500 generates to be used as part of an authentication and validation process before providing SaaS data to the LI Server 100. In some implementations, the SaaS server 500 can verify SaaS application policies and/or the legitimacy of the LI server 100 before generating a CAID and key. For example, the SaaS server can control and/or decide if the LI server 100 should be allowed to receive a CAID and a key, based on a white or black list containing names of users, companies and/or organizations permitted or prohibited to receive SaaS data and/or any other type of data a user, company or organization may request to receive. After determining if the LI Server 100 can receive a CAID and key, the SaaS server 500 can send a CAID and key response 1009 containing the requested credentials.

An example of content comprised in a CAID and key response 1009, substantially in the form of an HTTP(S) POST message including XML-formatted data, is provided below:

```
1.  POST /CAID_Key_response.php HTTP/1.1
2.  Host: www.LI_Server.com
```

-continued

```
3.    Content-Type: Application/XML
4.    Content-Length: 328
5.    <?XML version = "1.0" encoding = "UTF-8"?>
6.    <CAID_K_response>
7.        <timestamp>2020-12-12 15:00:00</timestamp>
8.        <SaaS_ID>1574</SaaS_ID>
9.            <CAID>74198MQ2217935B</CAID>
10.           <secret_key>72fd00167aff0421ca1275db9216e</secret-
              _key>
11.       .
12.       .
13.       .
14.   </CAID_K_response>
```

As shown in the XML structure above, a CAID and key response 1009 can include the following fields:

69.1. a timestamp indicating the date and/or time the response 1009 was sent by the SaaS server 500;

69.2. SaaS identification number which uniquely identify the SaaS server;

69.3. a communication access identifier (CAID) required to establish a relationship between the web application associated with the LI Server 100 and the SaaS application hosted in the SaaS server 500;

69.4. a secret key to provide access to the specific web application running in the LI server 100; and 69.5. a list of entries specifying fields that are permitted to be transmitted from the SaaS Server 500 to the LI server 100.

Thereafter, the user 600 in communication with the client terminal 300 can receive code 1017 to load a login application, for example, by entering a Uniform Resource Locator (URL) on a browser running on the client terminal 300. In some implementations, the login application running on the client terminal 300 can display a dialog box to handle a login operation to the SaaS server 500. The user 600 can enter her credentials into the dialogue box and she can specify the SaaS data she would like to schedule for backup.

The user 600 can enter to the client terminal 300 her credentials, a backup schedule and/or a set of data fields to be backed up. Thereafter, the client terminal 300 can send a login to SaaS application request 1019. Upon reception of the request 1019, the SaaS server 500 can return a Login to SaaS application response 1023 validating or denying the access to the SaaS server 500. An access denied can result when the user enters a set of invalid credentials and/or if the request 1019 specifies a dataset not permissible to the user 600. If the access is validated by the SaaS server 500, the information entered by the user 600 including credentials and the specified data fields can be stored in the client terminal 300 (for example, in a cookie or similar technology) such that, when there is a valid cookie, the LI server can connect to the SaaS server seamlessly utilizing the information stored in the cookie coupled with the LI server CAID and the key received in the response 1009. Such a connection can be established upon loading the LI server login application and/or when the LI server requires retrieving data fields from the SaaS server 500 for backup purposes according to a schedule specified by the user 600.

A person of ordinary skill in the art would recognize that when a login to SaaS application response 1023 is valid or successful, the user credentials and selected data fields can be alternatively or additionally stored in the LI server 100 in a similar way as indicated in FIG. 1A.

Via the client terminal 300, the user 600 can request a SaaS application data backup 1021 in an analogous way as already described with respect to the request 1001 in FIG. 1A (excluding the user authentication credentials). Thereafter, the LI Server 100 can send a Store new SaaS LI task request 1013 to the LI Database 200 with the received data and information. The Store new SaaS LI task request 1013 causes the LI Database 200 to store the SaaS application backup request 100, and can be made, for example, by an "INSERT INTO" statement in Standardized Query Language (SQL). Thereafter, the LI Database 200 can confirm if the insert operation was successfully executed by sending a Store new SaaS LI task response 1015 to the LI Server 100 containing a success or failure or failure to execute status.

In this instance, whenever the SaaS LI task is due to be executed, the LI server 100 can connect to the SaaS server 500 utilizing the CAID and Key received in the response 1009 and user-specific credentials. The user-specific credentials can be stored in a file or cookie residing in the client terminal 300 when the LI Server login application is utilized, thus providing an optional alternative implementation to some businesses or other organizaions that may wish to avoid storing user-specific credentials in the LI Server (e.g., in the LI Database).

Figure 2A:
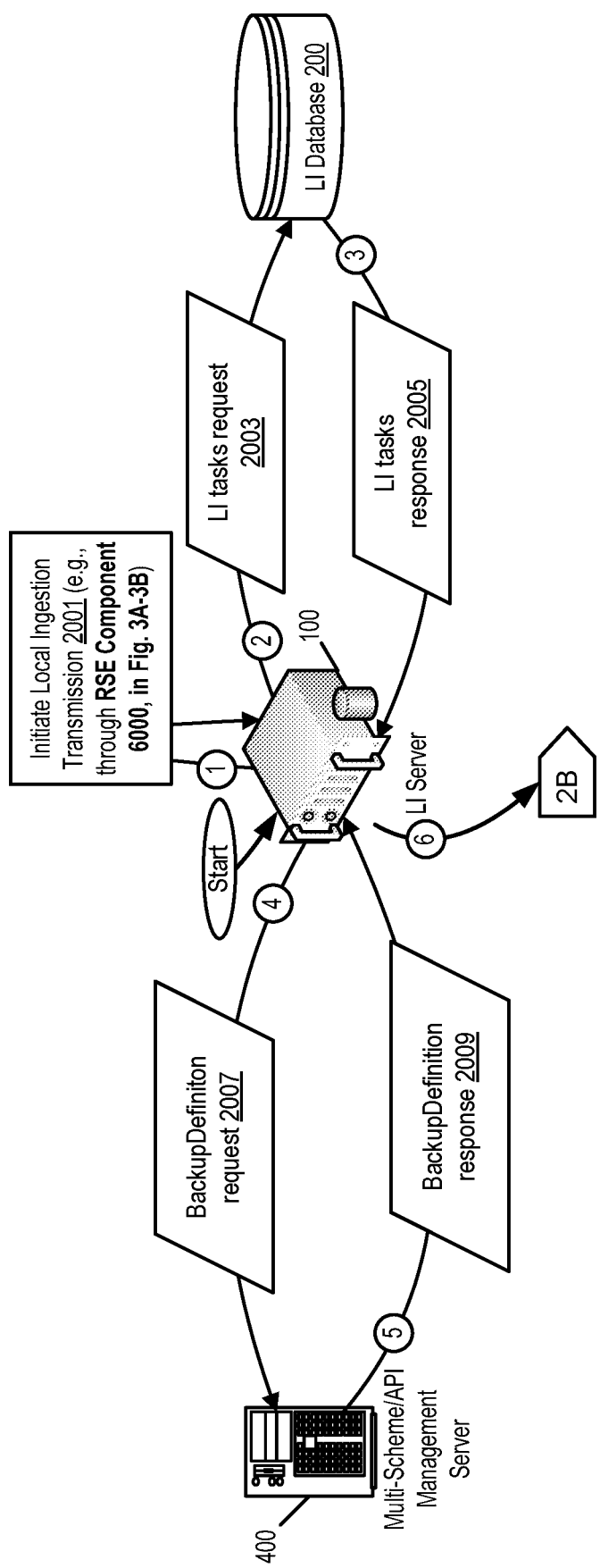
FIG. 2A-2B illustrate an example data flow during the ingestion of SaaS data by the LI Server of FIGS. 1A-1B, according to inventive aspects of the present disclosure.
Figure 2B:
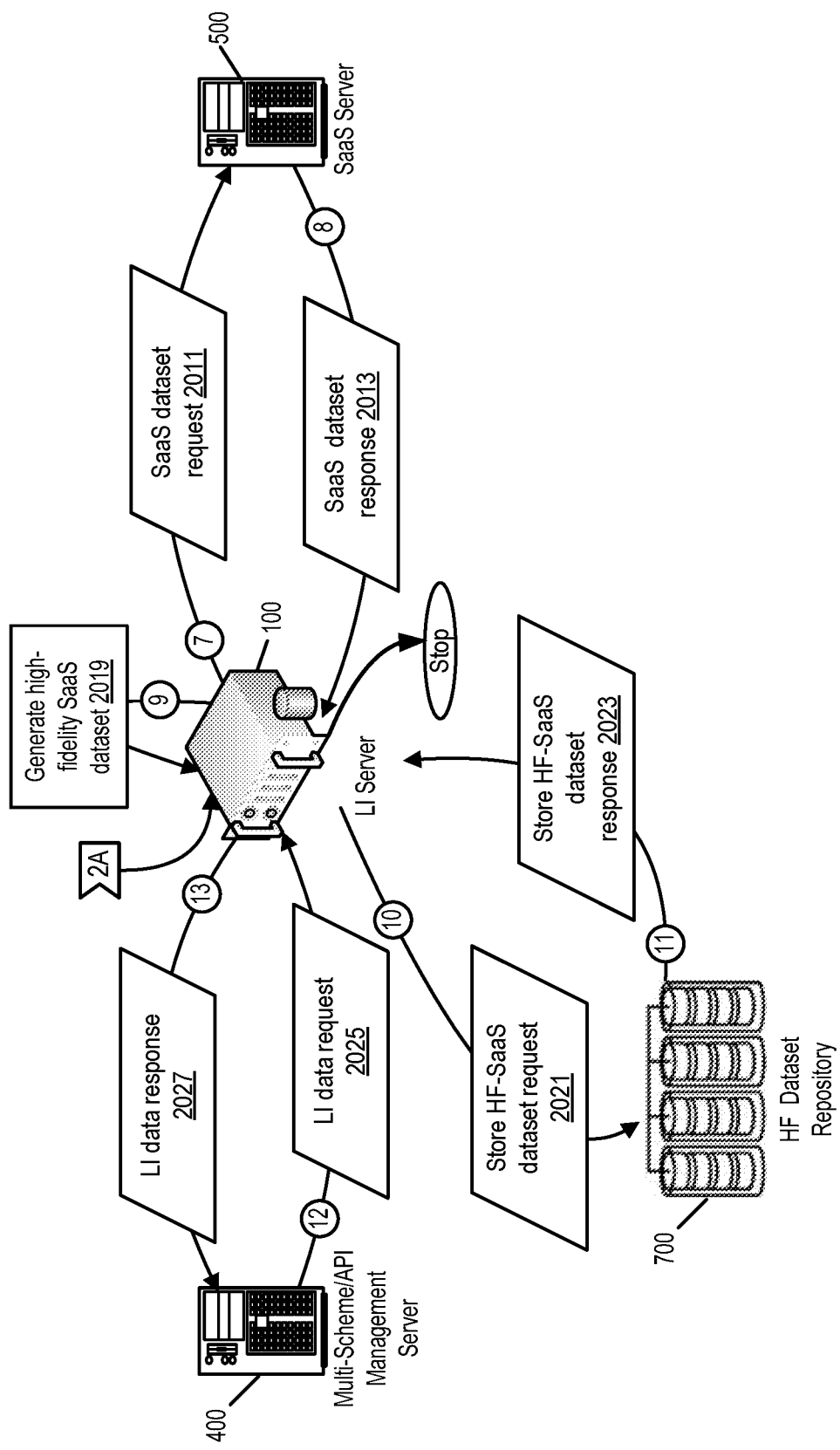

FIGS. 2A-2B illustrate an example data flow during the execution of a local ingestion of SaaS data by the LI server 100 of FIGS. 1A-1B, including the implementation by the LI server of a Reverse Synchronization Execution component, e.g., RSE Component 6000, to retrieve data managed by a SaaS server (i.e., SaaS application data). Once the SaaS application data is retrieved by the LI server, the retrieved SaaS application data can be viewed by a user (e.g., an employee using a client terminal connected to the LI server via a LAN) and/or processed to generate different types of backups, for example, a base backup, an incremental backup, a differential backup and/or any combination thereof.

FIG. 2A illustrates an example data flow during the initiation of an LI transmission and the acquisition of a Backup Definition. The LI Server 100 can initiate a local ingestion transmission 2001, to perform a scheduled backup of SaaS application data, through an RSE Component 6000 (described below with respect to FIGS. 3A and 3B). After initiating a local ingestion transmission process 2001, the LI Server 100 can send an LI tasks request 2003 to the LI Database 200 to retrieve one or more backup tasks that are scheduled to be performed at a specified time. The one or more backup tasks could have been previously stored in the LI Database 200 as a result of, for example, a SaaS application task request 1001 and/or 1021, and processed by the LI Server 100, as described above with respect to FIG. 1A-1B.

Upon receiving the LI tasks request 2003, the LI Database 200 can identify the task due by the specified time and send to the LI server 100 an LI tasks response 2005, the response containing backup task(s) that are scheduled to be performed at the specified time. In some instances, the LI tasks response 2005 can include, among other things, the content received in a SaaS application data backup request 1001 or 1021 associated with a backup task, or at least a subset of data "fields" contained therein.

For example, the user 600 (shown in FIGS. 1A-1B) could have sent a SaaS application data backup request 1001 (FIG. 1), indicating that all data from a particular file hosting SaaS application shall be backed up daily at midnight. Each day, just prior to midnight, the LI Database 200 (e.g., upon receiving an LI tasks request 2003 from the LI Server 100) can send to the LI Server 100 an LI tasks response 2005 with a command to perform a backup of all or a subset of the data from that particular file hosting SaaS application.

After receiving the LI tasks response 2005, the LI Server 100 can analyze the LI tasks response 2005. A typical response 2005 includes data and information required to perform one or more backup task(s). In instances where the LI tasks response 2005 includes backup task(s), (e.g., a scheduled task received through a SaaS application data backup request 1001 and/or 1021 associated with a particular SaaS application), the content of the response 2005 can be parsed to extract information. For example, the LI Server 100 can parse the SaaS application data backup response 2005 provided above and in particular the "SaaS_name" field, to determine that the backup task is scheduled to be executed on a SaaS application identified, for example, as "Dbox."

After analyzing the LI tasks response 2005, the LI Server 100 can send a Backup Definition request 2007 to a secure cloud-based server owned by a vendor of Backup Definitions (e.g., the Multi-Scheme/API Management Server 400). These Backup Definitions can be utilized to perform the backup tasks and, as noted above, include important information to enable the interaction of a third-party system (e.g., the LI Server 100) with one or more particular SaaS applications. After receiving the Backup Definition request 2007, the Multi-Scheme/API management Server 400 can retrieve the requested Backup Definitions, for example, from a local memory or a repository (not shown in FIG. 2A), and send them to the LI Server 100 in a Backup Definition response 2009.

In some instances, the secure cloud-based Multi-Scheme/API Management Server 400 can be a centralized repository dedicated to store Backup Definitions, where a vendor is responsible to keep up-to-date Backup Definitions according to the latest SaaS software updates and SaaS API releases. A Backup Definition response 2009 can include one or more API tree data structures, with nodes defining a collection of Application Program Interface (API) routines, Endpoints, Application Data Schemes, Trigger Fields, protocols, and/or tools accessible to be utilized by third party applications, such as an application running on the LI Server 100.

An example of content included in a Script Snippet of a Backup Definition response 2009 to establish an API endpoint connection and retrieve information related to a folder, substantially in the form of Ruby source code, is provided below:

```
 1. ensure_record(
 2.     bd.variable_mappings,
 3.     {type: "Oauth2Mapping"},
 4.     { }
 5. )
 6.     d = bd.variable_declarations.where(key:
        'oauth2_client_id').first
 7.     d.default_value =
        LIConfig.LI_service.definition_keys.dropbox_business.CAID
 8.     d.save!
 9.
10.         d = bd.variable_declarations.where(key:
            'oauth2_client_secret_key').first
11.         d.default_value =
            LIConfig.LI_service.definition_keys.dropbox_business.client_secret_key
12.         d.save!
13.
14.         d = bd.variable_declarations.where(key:
            'oauth2_authorize_url').first
15.         d.default_value =
            "https://www.Dbox.com/1/oauth2/authorize"
16.         d.save!
17.
18.         d = bd.variable_declarations.where(key:
            'oauth2_token_url').first
19.         d.default_value =
            "https://api.dropbox.com/1/oauth2/token"
20.         d.save!
21.
22.         folders_ep = ensure_record(
23.             bd.endpoints,
24.             {name: "Folders"},
25.             {
26.             index_url:
        "https://api.dropbox.com/1/metadata/auto{{path.split('/').map(bfy
        _v1.util.uri_encode).join ('/')}}?list=true",
27.                 field_records_path: 'contents',
28.                 field_id: 'path',
29.                 field_version: 'rev',
30.                 field_sort: 'path',
31.                 field_display: "{{path.split('/').slice(-1)[0]}}",
32.                 field_skip: 'is_dir',
33.                 field_skip_pattern: 'false',
34.                 display_fields: [ ],
35.             }
36.         )
```

As shown in the Ruby source code, a Backup Definition response 2009 can include the following processor executable instructions:

83.1. Instructions to perform a Variable Mapping (lines 1-5). A group of variables is generated to let the LI server 100 supply variable values. In this instance, the variable group is utilized to receive variable values related to an authentication session through the authorization standard OAuth;

83.2. Instructions to perform a Variable Declarations (lines 6-20). A first variable is declared to store a communication access identifier (CAID), wherein the CAID is an identification number specific to an LI server application (lines 6-8). A second variable is declared to store a secret key; the secret key is a type of passcode specific to the LI server application (lines 10-12). A third variable is declared to store a URL address corresponding to the SaaS application to which the LI server 100 intends to establish a connection (lines 14-16). A fourth variable is declared to store a token associated with an authentication session between the LI server 100 and the SaaS server 500 (lines 18-20).

83.3. Instructions to connect and retrieve information from an Endpoint (lines 22-36). In this instance, the instructions to connect to a "Folders" Endpoint are included in the received Backup Definition response 2009. The Endpoint can be accessed through the URL provided in the line 26. Various information and data can be obtained from the "Folders" Endpoint, including but not limited to, content, version or revision, metadata and the like folder related information.

The LI Server 100 can use the data and information included in the Backup Definition response 2009 to connect and exchange data with the SaaS server 500 shown in FIG. 1B, as discussed further below in connection with FIG. 2B.

In some implementations, a Backup Definition is often specific to a particular SaaS application (e.g., the "Dbox" application), and is intended to be utilized with a determined type of SaaS service or applications (i.e., the Backup Definition may not be used to connect and interact with SaaS servers hosting other types of SaaS services or applications). In such instances, the Backup Definition request 2007 can include requests for one or more Backup Definitions specific and corresponding to one or more SaaS applications, according to the results of the analysis of the LI tasks response 2005.

FIG. 2B continues the example data flow illustrated in FIG. 2A in connection with ingestion of SaaS data by the LI server 100, and the creation and storage of high fidelity SaaS datasets. In some implementations, the LI server 100 can utilize a Backup Definition received from a Multi-Scheme/ API Management Server 400, and configured with authentication variables for the LI server 100, to send a SaaS dataset request 2011 to a SaaS Server 500. For example, the SaaS dataset request 2011 can request data and/or information related to one or more folders previously described in the Ruby Source Code. The LI Server 100 can use the numerous protocols and the routines included in the API tree from the Backup Definition to upload files, data fields, metadata and the like types of information from the SaaS server 500. After receiving the SaaS dataset request 2011, the SaaS Server 500 retrieves the requested data (for example, from memory of the server 500 or another repository—not shown in FIG. 2B), and sends the data (e.g., files and associated metadata), in a SaaS dataset response 2013, to the LI Server 100.

In some inventive implementations, the SaaS dataset received by the LI server 100 in the SaaS dataset response 2013 can be converted by the LI server into a High-Fidelity Format. An Application Data Scheme with rules to convert a SaaS dataset into a High-Fidelity Format for a given SaaS dataset can be included in a Backup Definition and maintained up-to-date by the Backup Definition vendor. In some implementations, as shown at 2019 in FIG. 2B, the LI server 100 can convert the data received in the SaaS dataset response 2013 to generate a High-Fidelity Format version of the SaaS dataset, and send a Store High-Fidelity SaaS data set request 2021 to a High Fidelity dataset repository 700 which stores the High-Fidelity Format version of the SaaS dataset. As discussed in greated detail below in connection with FIG. 3B, in some implementations the LI server 100 can also encrypt the data received in the SaaS dataset response 2013, either before or after conversion of the data to High-Fidelity Format. It should be appreciated that, in various implementations, the High Fidelity dataset repository 700 may be resident in the LI Server 100, resident in another server/storage device in the LAN of a business or other organization, or resident in a remote server/storage device.

The High Fidelity dataset repository can store one or more High-Fidelity SaaS datasets, for example, through an "INSERT INTO" statement in Standardized Query Language (SQL) when there is a database implemented in the repository 700 or through a write operation when a file system is utilized. The High Fidelity Repository 700 can send an outcome, result or feedback in response to the requested storage operation in the repository 700 (for example, feedback information of the store operation outcome like success or failure status) via a Store High-Fidelity SaaS dataset response 2023.

In various aspects, the conversion of data in a native format to a High-Fidelity Format in connection with backing up data addresses issues relating to the variety of proprietary data formats that exist for both SaaS applications and non-SaaS applications, and the possible evolution over time of a proprietary format for a given SaaS or non-SaaS application (e.g., with prospective versions of an application).

In particular, for a given application, proprietary format changes may give rise to incompatibilities or inconsistencies with respect to similar data that is periodically backed-up from the application over time (e.g., later versions of the data may include different metadata format and/or content). Accordingly, by converting data in a native format to a consistent and stable "canonical" or High-Fidelity Format, the integrity of backed-up data from an application may be maintained over greater periods of time (notwithstanding occasional changes in the native format that may be implemented by an application provider). If/as such changes in native format occur, the Application Data Scheme for the application may be updated and provided to the LI Server by a Backup Vendor as part of a Backup Definition (e.g., from the Multi-scheme/API Management Server 400 in FIG. 2A) to map data in the new native format to the High-Fidelity Format so as to ensure the ongoing stability and integrity of backed-up application data stored in the HF dataset repository.

Similarly, different Application Data Schemes may be provided for different SaaS applications and non-SaaS applications, and based in part on the respective types of data expected to be generated by these applications (e.g., documents, spreadsheets, electronic mail, contacts, images, audio, etc.), so as to convert native data to an application-independent High-Fidelity Format. By storing files of similar types (but from different applications) in a High-Fidelity Format, the information across these files may be holistically indexed and interrogated for particular content, patterns or relationships, trends and the like. To this end, in some implementations multiple examples of High-Fidelity Formats may be employed to store different types of HF datasets; for example, a first High-Fidelity Format may be employed to store text document files generated by different applications (e.g., Google Does v. Microsoft Office 365), a second High-Fidelity Format may be employed to store spreadsheet files generated by different applications, a third High-Fidelity Format may be employed to store image files generated by different applications, a fourth High-Fidelity Format may be employed to store contacts generated by different applications, a fifth High-Fidelity Format may be employed to store audio files generated by different applications, and so on.

Figure 10:
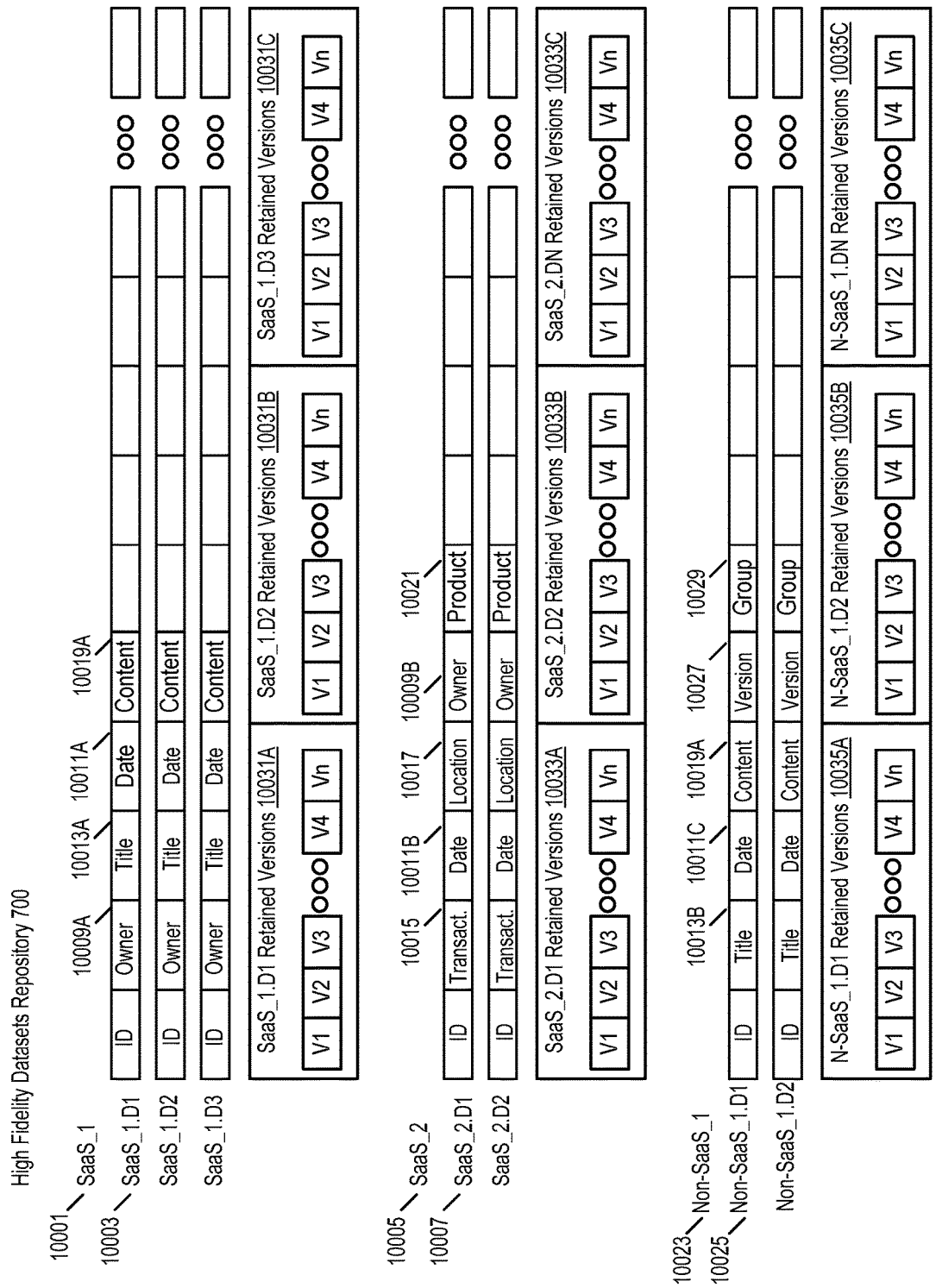
FIG. 10 illustrates an example of high-fidelity datasets of backed-up SaaS data and non-SaaS data stored in a local or remote repository, according to inventive aspects of the present disclosure.

For different file types, a particular High-Fidelity Format may be determined in part by the content of metadata generally associated with a particular type of file by different applications (i.e., the various attributes of a file that are catalogued in the metadata associated with the file may be used to determine the High-Fidelity Format). For example, the metadata content generally provided by different applications for creating text document files may include information relating to author, title, commenters, last update, an access control list (e.g., read, write and execute permissions), and versions/revisions. These different categories or "fields" may be organized in a particular manner (e.g., using XML, CSV, JSON) to provide a High-Fidelity Format for text document files. It should be appreciated that similar or different categories germane to other types of files (e.g., spreadsheets, images, audio, contacts, etc.) may be used for High-Fidelity Formats corresponding to these other types of files. FIG. 10, discussed in greater detail below, provides multiple examples of High-Fidelity Format datasets from different applications.

Once a High-Fidelity Format is determined for a particular type of file, respective Application Data Schemes can be established to convert native data for files of this type from different applications to the High-Fidelity Format for that type of file. In some implementations, a High-Fidelity Format of a particular type of file provides a canonical format for file metadata, which canonical format in turn may be stored together with the underlying binary for the substantive file contents as the backed-up data for the file.

In some implementations, the LI server 100 can receive a LI data request 2025 from the secure cloud-based Multi-Scheme/API Management Server 400. Upon receiving the request 2025, the LI server can send a LI data response 2027 including a SaaS or non-SaaS dataset in a SaaS native format and/or a dataset converted to a High-Fidelity Format. As such, several copies of datasets can coexist in the LI server 100 and remotely in the secure cloud-based Multi-Scheme/API Management Server 400 or in remote repositories otherwise accessible to the server 400.

Figure 3A:
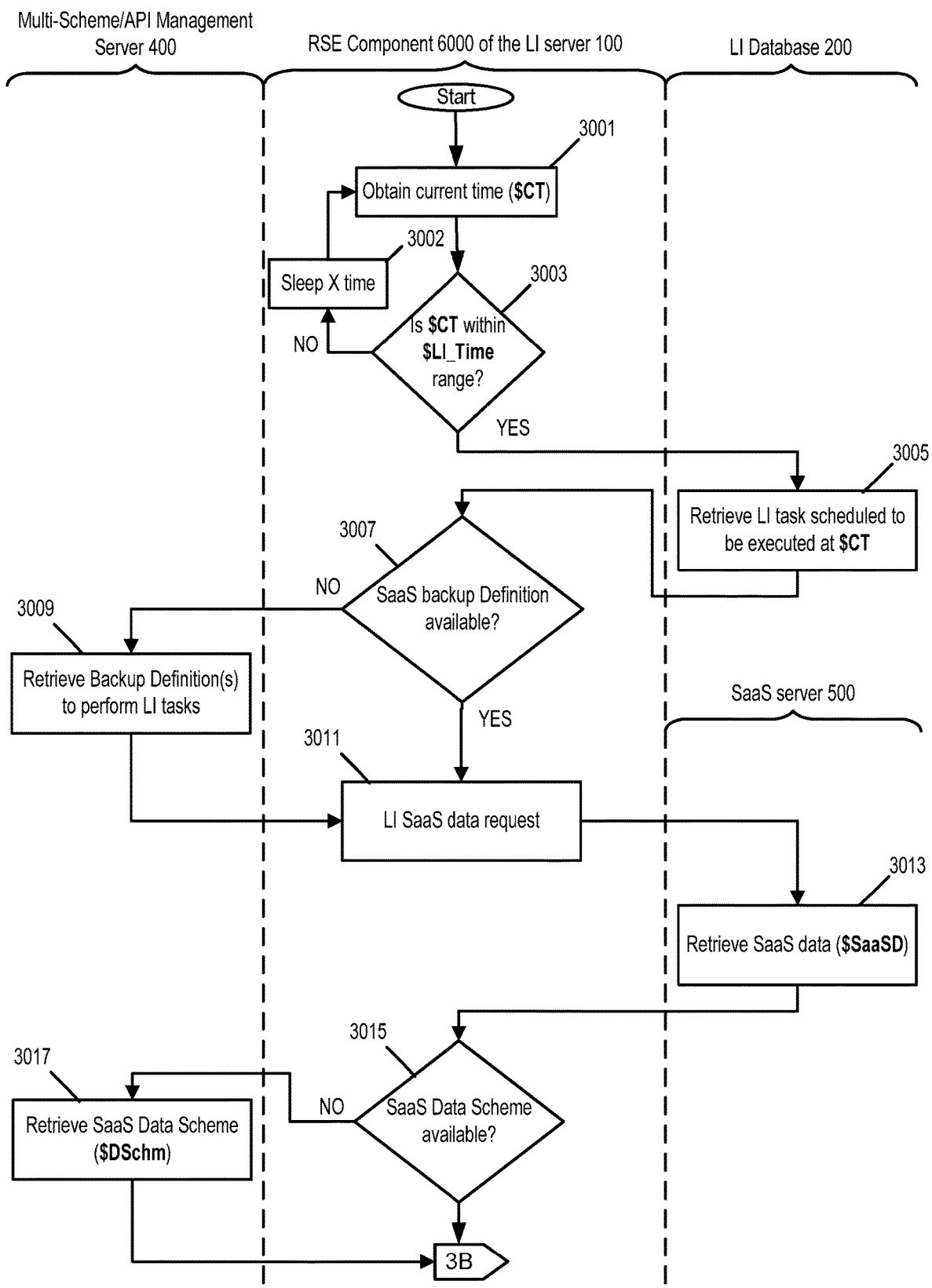
FIGS. 3A-3B illustrate an example logic flow for the ingestion of SaaS data from an SaaS application by the LI Server, according to inventive aspects of the present disclosure.
Figure 3B:
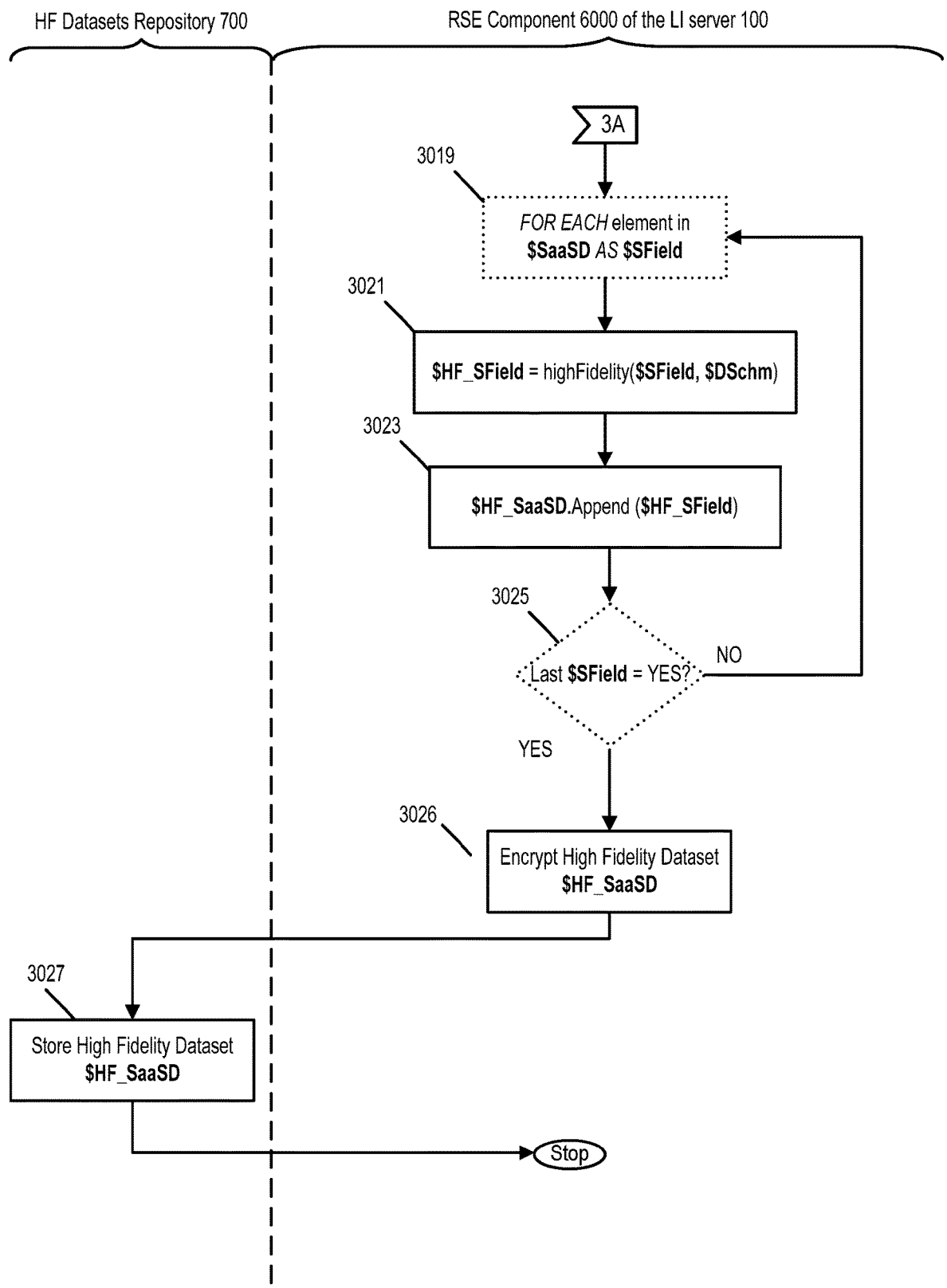

FIG. 3A-3B illustrate an example logic flow to execute a local ingestion by an LI server of SaaS data from a SaaS application server through an RSE Component 6000. In some implementations, a reverse synchronization execution (RSE) component can run as a background process to obtain the current time 3001 and verify if the obtained current time matches or falls into a time range for which a local ingestion (LI) task is scheduled ($LI_Time). For example, the conditional statement 3003 can be utilized to verify if an LI task is scheduled for the current time. When there is no scheduled task, the RSE component can wait for a determined period of time as shown at 3002 ("Sleep X time") and then obtain the current time and verify the conditional statement 3003 in a further iteration. However, if there is a scheduled task for the current time, the RSE component can query LI database 200 (e.g., see LI tasks request 2003 in FIG. 2B) and retrieve one or more LI tasks scheduled to be executed at the current time, as shown at step 3005 (e.g., see LI tasks response 2005 in FIG. 2B).

The RSE component can verify if a Backup Definition required to perform the retrieved LI task(s) is available in local memory of the LI server 100, for example, through the conditional statement 3007. If a Backup Definition is not available in local memory, then the RSE component 6000 can retrieve from a vendor (for example the Multi-Scheme/API Management server 400 shown in FIG. 2B) one or more Backup Definitions to perform the LI tasks, as shown in step 3009. Once the RSE component 6000 receives or if it already has the required Backup Definitions in local memory, it can initiate a LI SaaS data request 3011 (e.g., see SaaS dataset request 2011 in FIG. 2B). As noted above, the Backup Definition can include multiple data structures, API routines in an API Tree Structure, Endpoint locations, protocol information, and/or data scheme specific to an application hosted in a SaaS server, in this instance, the SaaS server 500. Additionally, a Backup Definition can include one or more Trigger Fields and logic to traverse or walk an API Tree Structure, e.g. the /folders Endpoint can trigger the /files Endpoint for all files contained within a folder.

The data and information included in the Backup Definition can be utilized to execute the operation at 3013 to retrieve SaaS data from the SaaS server 500 and "ingest" this SaaS data by the LI server 100 (e.g., see SaaS dataset response 2013 in FIG. 2B). Thereafter, the RSE component 6000 can verify through the conditional statement 3015 if an Application Data Scheme is available in local memory. In some instances, an Application Data Scheme can be received in a Backup Definition; however there could be instances when an Application Data Scheme can be requested and provided separately, as shown at step 3017 (Retrieve SaaS Data Scheme ($DSchm).

Next with reference to FIG. 3B, the RSE component 6000 can initiate a loop or iterative process 3019 in which each field or segment in the SaaS data retrieved from the SaaS server 500 is converted into a field in a High Fidelity Format through the highFidelity function, which can take as parameters a field or segment in its native format ($SField) and an Application Data Scheme ($DSchm), as shown at step 3021. Additionally, each of the converted fields ($HF_SField) can be appended into a data structure, for example a $HF_SaaSD stack or list as shown at step 3023. The loop initiated at step 3019 can iterate until the last non-converted SaaS data field or segment is processed; this condition can be expressed through the conditional statement shown at 3025. Once all the fields have been converted into a High Fidelity Format, at step 3026 the RSE component 6000 may optionally encrypt the converted SaaS data. The encryption can be performed with a unique encryption key generated by the LI server 100 through the RSE component 6000. The RSE component can generate the key utilizing, for example, symmetric key algorithms such as Data Encryption Standard (DES) and/or Advanced Encryption Standard algorithms. Alternatively, the encryption key can be generated utilizing public-key algorithms, for example the RSA or cryptosystem algorithm (a corresponding key subsequently may be used to decrypt the SaaS dataset for restoring the dataset to the originating application). As also shown in FIG. 3B, at step 3027 the RSE component 6000 can store the content of the data structure $HF_SaaSD, either in the converted format or as converted/encrypted, into the High-Fidelity data set repository 700 shown in FIG. 2B.

Example Implementation: Cloud-Based SaaS Data Backup

In an alternative implementation, the ingestion of SaaS data can be executed by a Backup Definition vendor, for example, the Multi-Scheme/API Management Server 400. To this end, FIG. 4 illustrates an example data flow for this alternative implementation involving the Multi-Scheme/API Management Server 400 including a cloud-based ingestion component, e.g., CBI Component 9000.

Figure 4:
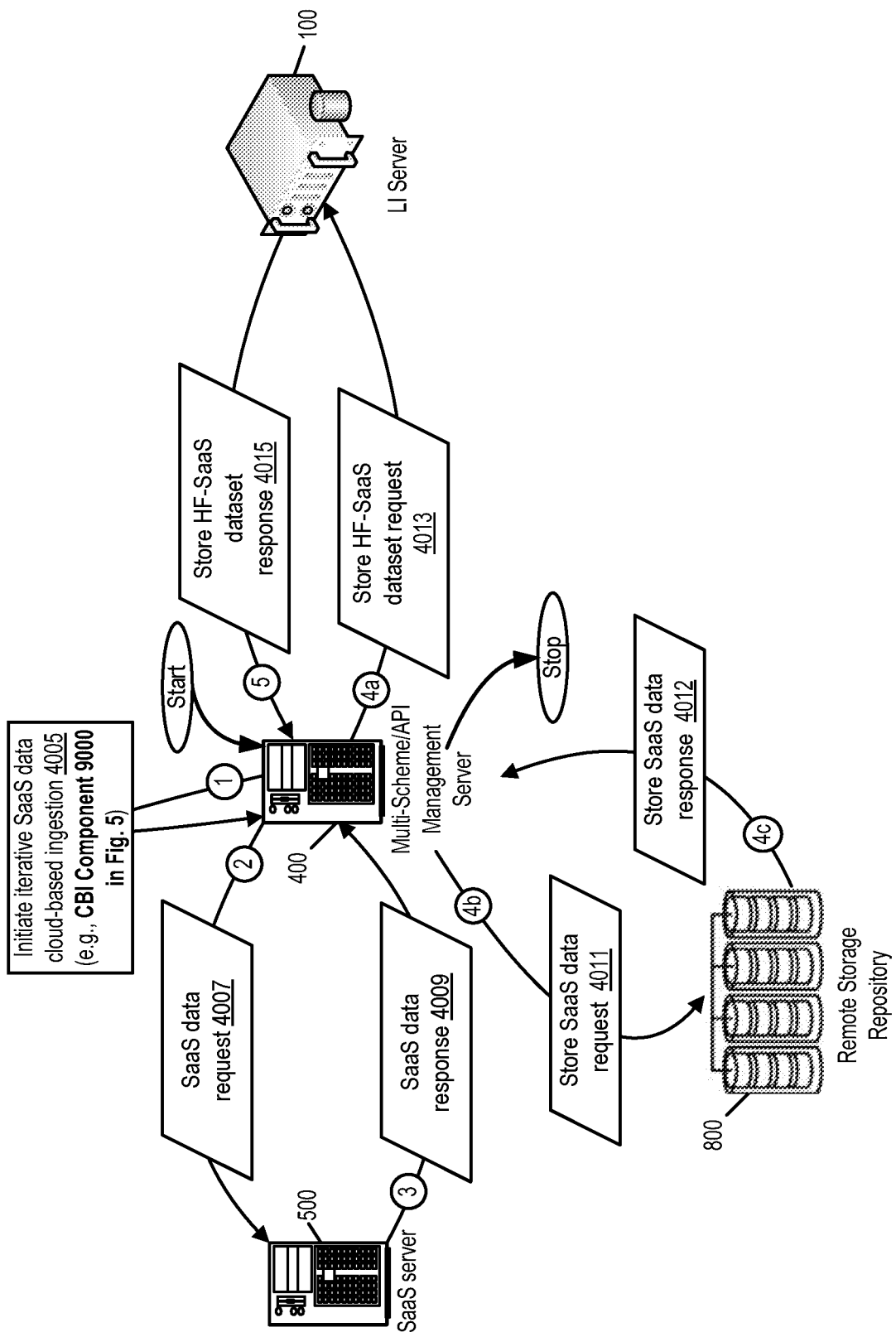
FIG. 4. illustrates an example data flow during the ingestion of SaaS data by a cloud-based Multi-Scheme/API Management Server, according to inventive aspects of the present disclosure.

In a manner similar to that discussed above in connection with FIG. 1A, the Multi-Scheme/API Management Server 400 in the example implementation of FIG. 4 can receive a SaaS application data backup request similar to the request 1001 shown with respect to FIG. 1A. In such a case, the secure cloud-based Multi-Scheme/API Management Server 400 can include a SaaS data task database (e.g., similar to the LI database 200 shown in FIGS. 1A, 1B and 2A), wherein SaaS data ingestion tasks can be stored and retrieved according to a scheduled time. Accordingly, the Multi-Scheme/API Management Server 400 can initiate a cloud-based SaaS data ingestion process, for example 4005, through the cloud-based ingestion (CBI) component 9000. Pursuant to execution of the CBI component 9000, the server 400 can send a SaaS data request 4007 to the SaaS server 500.

Similar to the SaaS dataset request 2011 discussed with respect to FIG. 2B, the SaaS data request 4007 can request SaaS data and/or information, according to a Backup Definition, of the SaaS data managed by the SaaS server 500 and the processes therein available to retrieve and restore the SaaS data. The Multi-Scheme/API Management Server 400 can utilize numerous protocols and the routines included in the API Tree of a Backup Definition. As such, the API Tree routines and content can be utilized by the Multi-Scheme/API Management Server 400 to upload files, data fields, meta-data and the like types of information from the SaaS server 500. After receiving the SaaS data request 4007, the SaaS Server 500 can retrieve the requested data, for example, from memory, and send the data, in a SaaS data response 4009, to the Multi-Scheme/API Management Server 400.

The Multi-Scheme/API Management Server 400 can contain the Application Data Scheme to convert a SaaS dataset received in the response 4009 into a High-Fidelity Format. Thereafter, the server 400 can send converted or non-converted SaaS data in a Store High-Fidelity SaaS dataset request 4013 to the LI Server 100. The server also may encrypt converted or non-converted SaaS data before sending the request 4013 to the LI Server to faciliate storage of encrypted SaaS data. The LI Server 100 can send an outcome, result or feedback to the server 400 (for example, an indicator of a store operation success or failure) via a Store High-Fidelity SaaS dataset response 4015. Alternatively and/or additionally, the server 400 can execute a command 4011 to store a copy of the SaaS data received in the response 4009 into a Remote Storage Repository 800 (e.g., associated with the server 400, in a manner similar to that in which the storage repository 700 may be associated with the LI Server 100). The data stored in the repository 800 can be in a High-Fidelity Format or it can be stored as received from the SaaS Server 500 (i.e., in its native format). Additionally, as noted above, the SaaS data stored in the repository 800 may be encrypted (either after conversion to High-Fidelity Format, or as received from the SaaS Server). Thereafter, the Multi-Scheme/API management server 400 can receive a store SaaS data response 4012 from the remote storage repository 800 with, for example, a notification of whether the store request 4011 was successfully executed or not.

Figure 5:
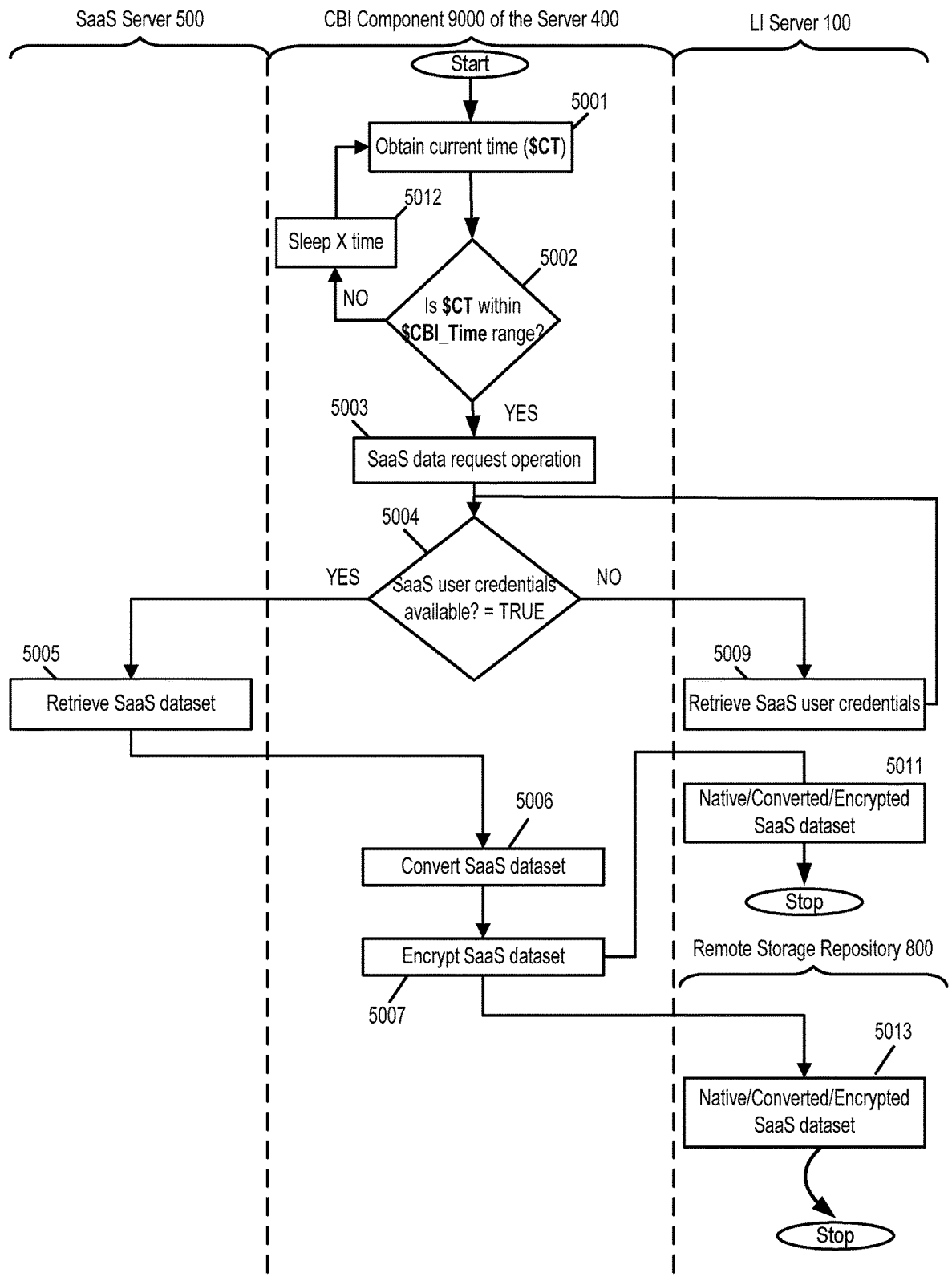
FIG. 5 illustrates an example logic flow for the ingestion of SaaS data from the cloud-based Multi-Scheme/API Management Server of FIG. 4, according to inventive aspects of the present disclosure.

FIG. 5 illustrates an example logic flow to execute SaaS data cloud-based ingestion from a Multi-Scheme/API Management Server including a CBI Component 9000. In some implementations, the cloud-based ingestion component (CBI) can run as a background process with executable instructions 5001 to obtain the current time and verify if the obtained current time matches or falls into a time range for which a cloud-based SaaS data ingestion is scheduled. For example, the conditional statement 5002 can be utilized to verify if a CBI task is scheduled for the current time or range of time (e.g., $CBI\_Time). When there is no scheduled task, the CBI component can wait for a determined period of time at 5012 (e.g., "Sleep X time") and then obtain the current time in a further iteration. However, if there is a scheduled task for the current time or range of time, the CBI component can initiate a SaaS data request operation 5003 scheduled to be executed at the current time, as shown in step 5003.

After the initiation of the SaaS data request operation 5003, the CBI component 9000 can verify if the user credentials to perform the initiated SaaS data operation 5003 are available, for example, through the conditional statement 5004. If the CBI component 9000 has the user credentials, then it can connect to the SaaS server 500 and retrieve a SaaS dataset as shown in step 5005. However, if the CBI component does not have the user credentials required to perform the initiated SaaS data request operation 5003, it can connect to the LI server 100 to retrieve the required user credentials, as shown at 5009. Having the user credentials, the CBI component can connect to the SaaS server 500 to retrieve a SaaS dataset, as shown at 5005.

In other aspect of the implementation shown in FIG. 5, as discussed above in connection with FIG. 4 the CBI component can optionally convert the SaaS dataset retrieved from the SaaS server 500 to a High-Fidelity Format, as shown at 5006, as discussed in connection with FIG. 3B (e.g., see loop 3019 and blocks 3021 and 3023). The CBI component also can optionally encrypt the SaaS dataset as retrieved from the SaaS server 500, or after conversion to High-Fidelity Format, as shown at 5007. In some implementations, the encryption can be performed with a unique encryption key generated by the server 400 through the CBI component 9000. The CBI component can generate the key utilizing, for example, symmetric key algorithms such as Data Encryption Standard (DES) and/or Advanced Encryption Standard algorithms. Alternatively, the encryption key can be generated utilizing public-key algorithms, for example the RSA or cryptosystem algorithm. A customer/user can utilize a corresponding key to decrypt the SaaS dataset. The server 400 can send copies of the native, converted and/or encrypted SaaS dataset 5011 and 5013 to the LI server 100 and the SaaS Remote Storage Repository 800 respectively. As such, the LI server 100 and the Remote Storage Repository 800 can receive a SaaS dataset in a High-Fidelity Format and/or in a SaaS native format, as well as encrypted SaaS data.

Example Implementation: Restoring SaaS Data from an LI Server

Figure 6A:
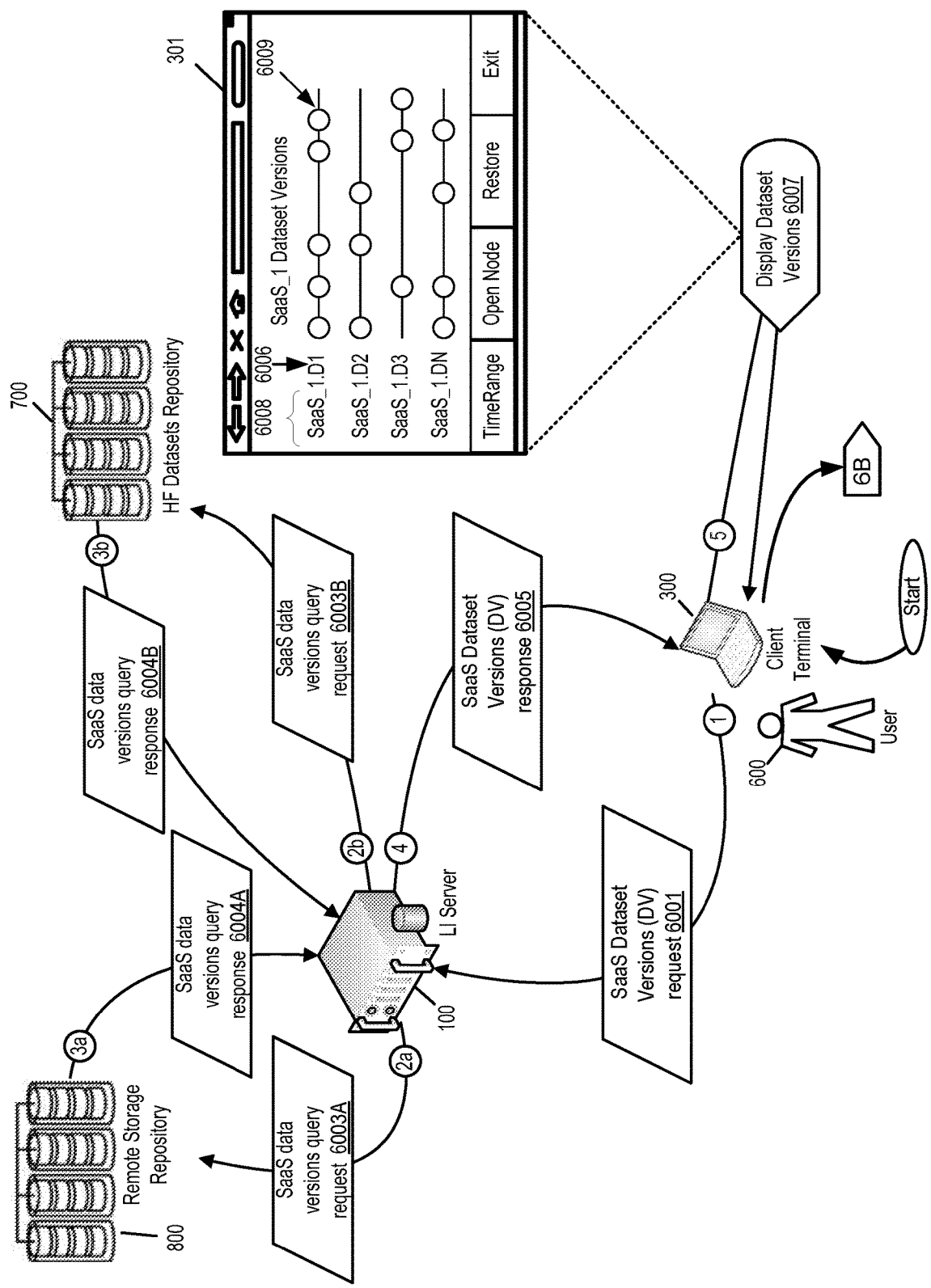
FIGS. 6A-6B illustrate an example data flow for restoring, by the LI Server of FIGS. 2A-2B, a backed-up SaaS dataset to a SaaS application, including conversion of the backed-up SaaS dataset to a native format for the SaaS application, according to inventive aspects of the present disclosure.
Figure 6B:
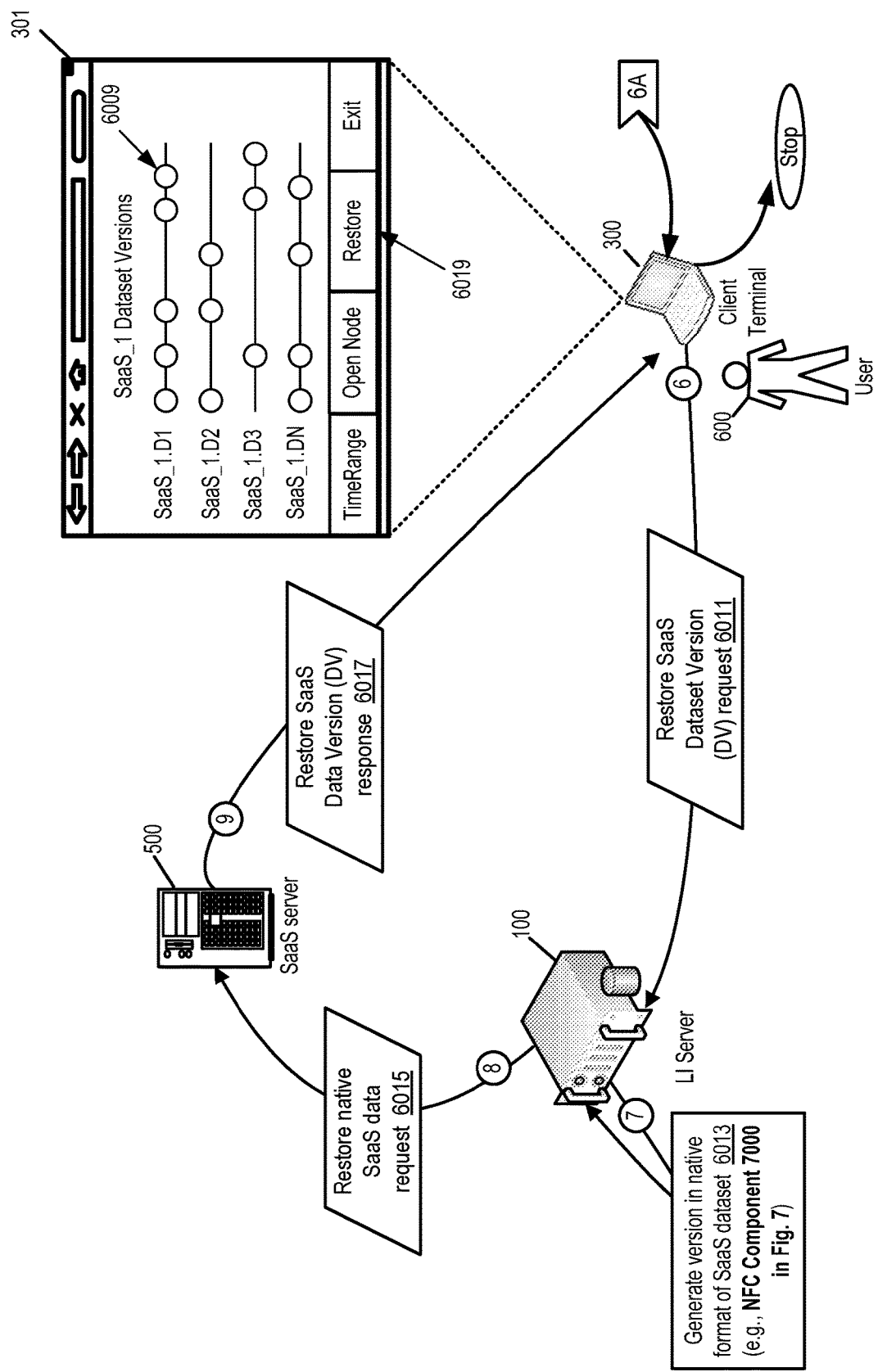

FIG. 6A-6B illustrate an example data flow to restore a backed-up SaaS dataset, file or document from an LI Server 100 to a SaaS application running on a SaaS server 500, according to another example implementation of the inventive concepts disclosed herein. One advantage provided by having backed-up SaaS datasets stored in the LI Server 100 in a High-Fidelity Format in some implementations is that the datasets can be converted into their native or original SaaS format through a Native Format Converter (e.g., NFC Component 7000) further described with respect to FIG. 7. A dataset in a SaaS native format can be restored seamlessly into a SaaS application such that all data, metadata and original properties of the original SaaS data remain intact through format conversions.

As shown in FIG. 6A, in some implementations a user 600 in communication with the client terminal 300 can initiate the restoration of one or more SaaS datasets from a particular SaaS application. The user 600 can execute a request 6001 to the LI server 100 to retrieve one or more previous versions or backup instances of one or more SaaS datasets. The requested versions reflect the state of a dataset, file and/or document captured or backed-up (e.g., by the LI Server 100 or the Multi-Scheme/API Management Server) at a previous time than the current, for example, a dataset provided in a SaaS data response 2013 as shown in FIG. 2B.

Next, the LI server 100 can receive the request 6001 and can verify if the dataset versions requested in 6001 are stored in the HF Datasets Repository 700 (associated with the LI Server 100—see FIG. 2B), the Remote Storage Repository 800 (associated with the Multi-Scheme API Management Server 400—see FIG. 4) and accordingly send a request to either or both repositories for the one or more SaaS datasets indicated in 6001. In some instances, all the requested versions can be available in one of the repositories and thus retrieved via one the requests 6003A or 6003B, and the corresponding responses 6004A or 6004B. However, in other instances, some of the requested versions can be stored in the local repository 700 while other versions can be stored in the remote repository 800. After the LI server 100 has retrieved the requested versions, it can send the requested versions in a Restore SaaS Dataset Version Response 6005 to the client terminal 300.

The client terminal 300 can receive and display 6007 the dataset versions received in the response 6005. A graphical user interface (GUI) 301 of the client terminal 300 can show the dataset versions of N records captured from one or more SaaS applications. The prefix SaaS_1 6008 can identify a particular SaaS application, while the suffix D1 6006 can identify a dataset, document and/or file in the SaaS application SaaS_1. The available versions of a dataset, document, and/or file can be represented in the GUI 301 as circles or nodes, e.g., 6009 in a timeline. These nodes represent a reference point in time when the dataset, document or file was backed-up from the SaaS application (e.g., by the LI Server 100 or Multi-Scheme/API Management Server 400). As such, the user 600 can click or hover over a circle or node to view information regarding that specific version, for example, a timestamp indicating when the version was captured or recorded, the memory consumed by the selected version, permissions allowed for the user 600 over the selected version, including read, write, execute and the like permissions.

FIG. 6B continues the example data flow illustrated in FIG. 6A. In some implementations, the user 600 in communication with the client terminal 300 can select, via the displayed GUI 301, a node 6009 representing a dataset, document, and/or file for restoration. The user 600 can click on the node and then she can press/click on the Restore button 6019 on the GUI 301. As a result, the client terminal 300 can send a Restore SaaS Dataset Version (DV) request 6011 to the LI server 100. Upon the reception of the request 6011, the LI server 100 can initiate a process to generate a version of the dataset corresponding to the selected node 6009 in a SaaS native format, through the Native Format Converter 7000 as shown in the box 6013 and discussed in greater detail in connection with FIG. 7.

Note, that once the dataset, document and/or file is converted to a particular SaaS data format, the LI server 100 can send a request 6015 to the SaaS server 500 to restore the SaaS data. Because the High Fidelity Format utilized by the LI server 100 contains all the data included in a SaaS dataset, document and/or file, and the way the data is represented in the SaaS application, the NFC Component 7000 can convert datasets from a High Fidelity Format to a native SaaS data format without losing any data or metadata included in the original format. As such, restored datasets, files and/or documents have the same content and properties as their original versions. Once the requested data has been restored into a SaaS server 500, the SaaS server 500 can send a Restore SaaS Data Version (DV) response 6017 to the client terminal 300 indicating the outcome of the restore operation, for example, success or failure.

Figure 7:
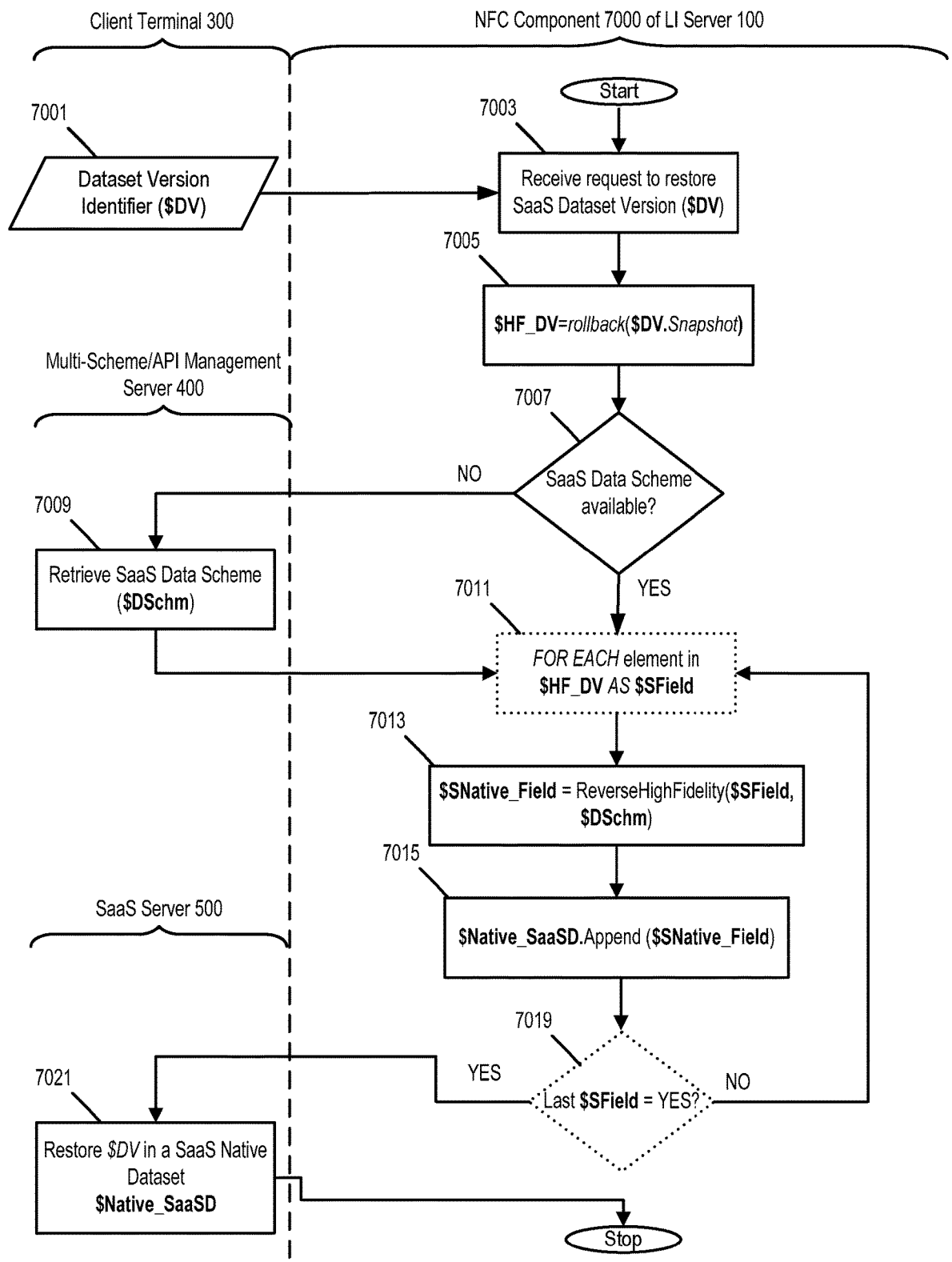
FIG. 7 illustrates an example logic flow for converting, by the LI Server of FIGS. 6A-6B, a backed-up SaaS dataset having a high fidelity format to the native format for the SaaS application, according to inventive aspects of the present disclosure.

FIG. 7 illustrates an example logic flow to convert a high fidelity dataset (e.g., retrieved from the repository 700 or the repository 800) into a native SaaS application format through an NFC Component 7000 of the LI Server 100. In some implementations, the NFC component 7000 can receive a request 7003 to restore a SaaS dataset version, from the client terminal, for example, the client terminal 300 (e.g., see request 6011 in FIG. 6B). The request 7003 can contain a dataset version identifier stored in a parameter, for example, in the variable $DV as shown at 7001. The dataset version identifier $DV can be associated with a snapshot identifier when, for example, snapshot technology is utilized to backup SaaS data. As such, a rollback function can be called utilizing the variable $DV as a parameter to generate a copy in High-Fidelity Format of the dataset version indicated by the variable $DV, as shown at 7005.

Next, the NFC component 7000 can verify if a SaaS data scheme (e.g., an Application Data Scheme for the particular SaaS application that generated the dataset) is locally available in memory of the LI Server 100 to perform a function to convert the format to its original form, e.g., transform a dataset in a High-Fidelity Format into a dataset in a SaaS native format. Such verification can be performed through the conditional statement 7007. When the required SaaS Application Data Scheme is not available at the LI Server 100, the NFC component 7000 can request the data scheme from a vendor system, for example, the Multi-Scheme/API Management Server 400. As such, the server 400 can retrieve at 7009 the requested SaaS Application Data Scheme, and return it to the NFC component in a data structure or parameter, e.g., $DSchm. Thereafter, the NFC component can start an iterative loop at 7011 to convert each element contained in the high-definition dataset version ($HFDV) structure created at 7005 into a native SaaS data format. Each element in the $HF_DV data structure can be converted in to a SaaS native format through a Reverse-HighFidelity function and temporarily stored in the variable $SNative_Field as shown in step 7013. Each field/element in a SaaS native format can be appended into the $Native_SaaSD data structure, as shown in 7015. The operations at 7011, 7013 and 7015 are executed for each element/field included in the dataset version $DV requested by the client terminal 300 at 7001 and 7003. The conditional statement 7019, breaks the iterative loop structure started at 7011 after all the elements/fields in the $HF_DV are converted into a SaaS native format. Then, the data version $DV converted into a SaaS native format can be restored in the SaaS server 500 as shown in the step 7021 (also see block 6015 of FIG. 6B).

Example Implementation: Integration of SaaS Data with Non-SaaS Data

Figure 8:
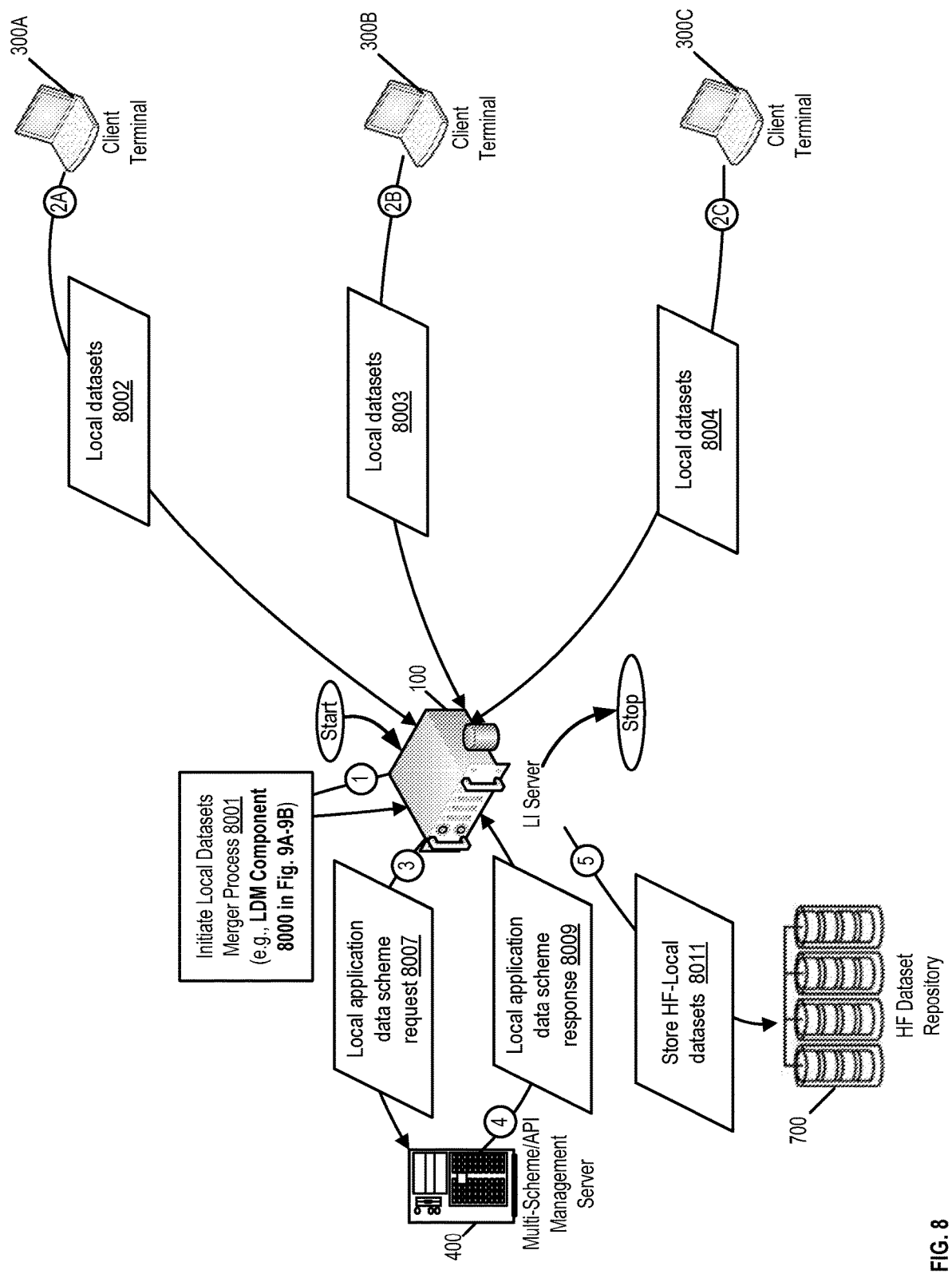
FIG. 8 illustrates an example data flow for the periodic acquisition, by the LI Server, of non-SaaS datasets from one or more applications resident and operating on client terminals in a business organization's LAN, according to inventive aspects of the present disclosure.

FIG. 8 illustrates an example data flow for the periodic acquisition of non-SaaS data from client terminals in one implementation of the LI server enhanced with a Local Dataset Merger component, e.g., LDM Component 8000. The LI server 100 can serve as a backup repository for non-SaaS data including datasets, documents and/or files produced locally in applications running on client terminals that are not part of a SaaS service. For example, local databases, text documents, executable files and the like can be replicated in the HF Dataset Repository 700 for local backups and further synchronized with a remote repository, for example the Remote Storage Repository 800 in FIG. 6A and FIG. 4.

In some implementations, the LI server 100 can initiate a local datasets merger process 8001 to receive datasets, files and/or documents produced in non-SaaS applications within a business organization's LAN, for example datasets 8002, 8003 and 8004 from client terminals 300A, 300B and 300C respectively. The LI server 100 can transform the received local datasets into a High Fidelity Format. The process to convert a local dataset into a High Fidelity Format is analogous to the conversion process described with respect to FIGS. 3A and 3B. To this end, in some implementations the LI server 100 can send the request 8007 to retrieve an Application Data Schemes for a particular non-SaaS application running on the client terminals, so as to convert non-SaaS data generated by the particular non-SaaS application into a high fidelity format version of the non-SaaS data. Such a request can be sent, for example, the Multi-Scheme/API Management Server 400. Upon receiving the request 8007 the server 400 can return the Application Data Scheme for the particular non-SaaS application in the response 8009. Thereafter, the LI server 100 can utilize the Application Data Scheme to convert the datasets received in 8002, 8003 and 8004 (from different client terminals running the same particular non-SaaS application) into a High Fidelity Format and then send executable instructions 8011 to store the converted datasets in the HF Dataset repository 700.

Figure 9A:
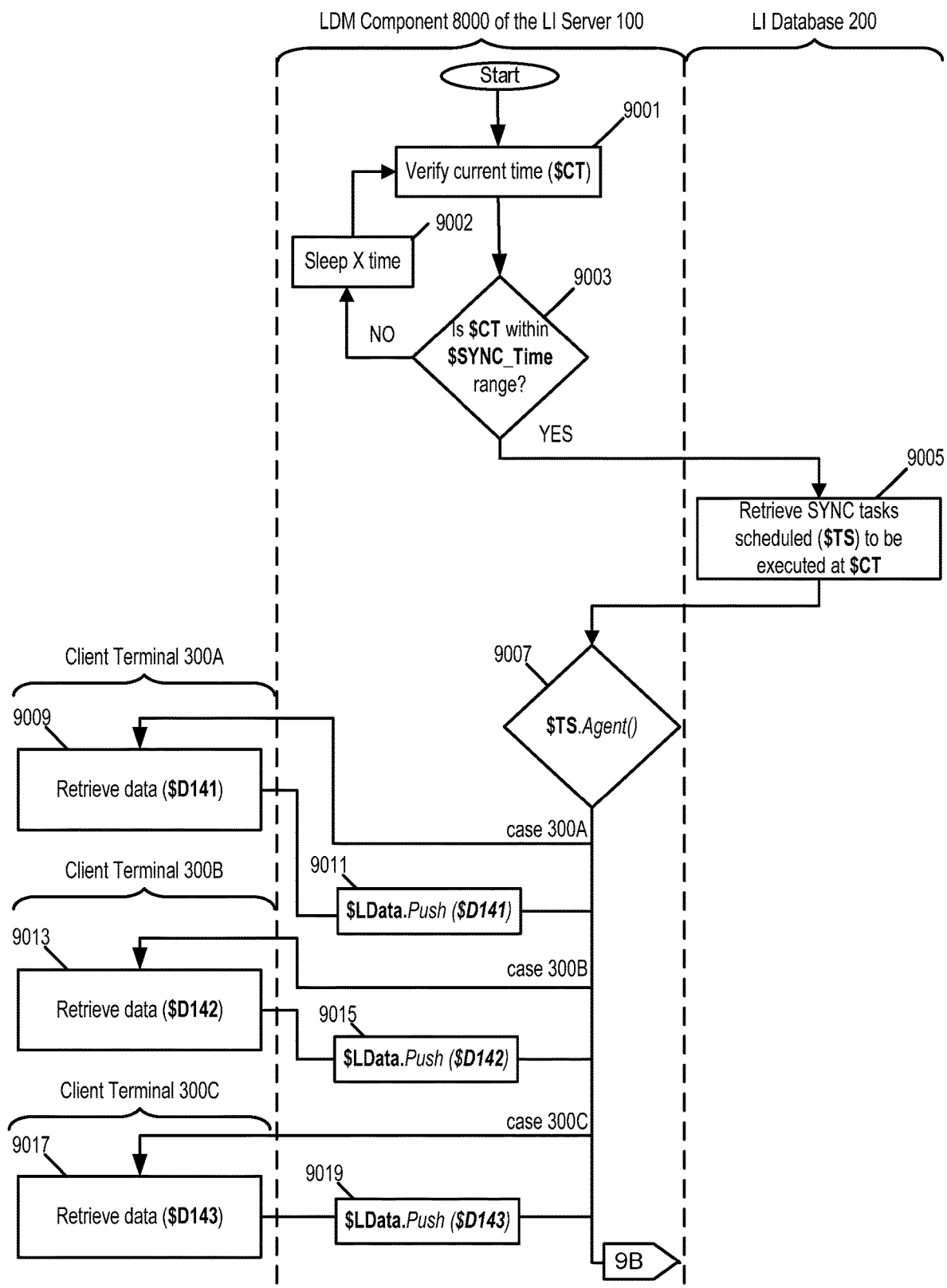
FIGS. 9A-9B illustrate an example logic flow for merging, by the LI Server, non-SaaS data sets acquired from one or more non-SaaS applications and converting, by the LI server, the non-SaaS data sets to high-fidelity datasets, according to inventive aspects of the present disclosure.
Figure 9B:
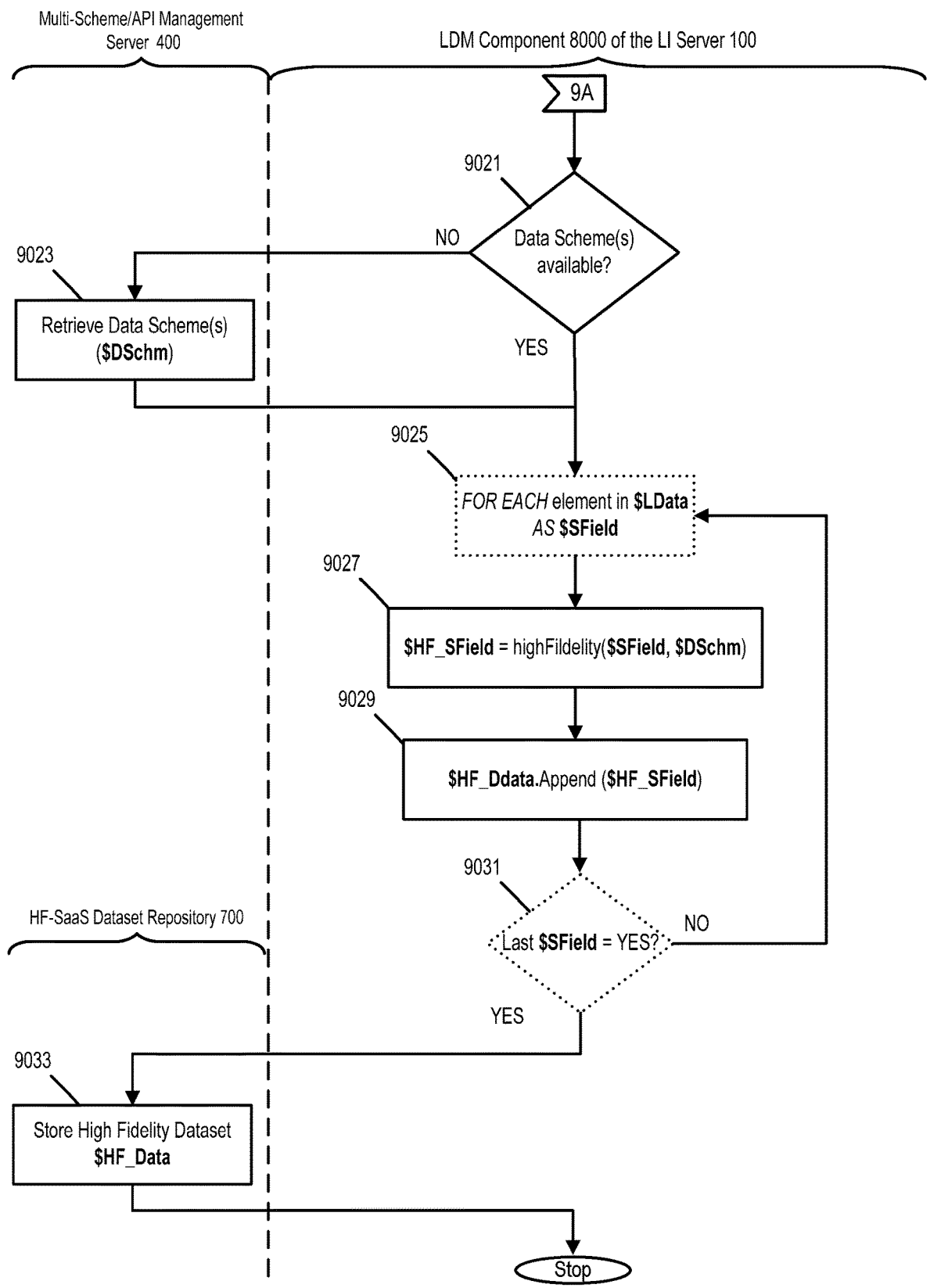

FIG. 9A-9B illustrate an example logic flow to acquire non-SaaS data from a particular non-SaaS application running on local client terminals in a LAN and generate high-fidelity datasets based on the non-SaaS data through an LDM Component 8000 of the LI Server 100. In some implementations, with reference first to FIG. 9A, a Local Data Merger (LDM) component can run as a background process to obtain the current time 9001 and verify if the obtained current time matches or falls into a time range for which a synchronization task is scheduled. For example, the conditional statement 9003 can be utilized to verify if a synchronization task is scheduled for the current time. When there is no scheduled task, the LDM component can wait for a determined period of time 9002 and then obtain the current time in a further iteration and verify again. However, if there is a scheduled task for the current time, the LDM component can query the LI database 200 and retrieve one or more synchronization tasks scheduled to be executed at the current time $CT, as shown at 9005.

The switch statement 9007 can be utilized to determine the target client terminal or agent for which a synchronization task is scheduled to be performed. In the example shown in FIG. 9A there could be three possible cases, i.e., client terminal 300A, client terminal 300B and client terminal 300C; however, a different number of cases (smaller or greater) can be configured in the LI server. For each of these cases, according to the switch structure 9007, the LDM component 8000 can retrieve datasets, as shown at 9009, 9013 and 9017 for a particular non-SaaS application running on the client terminals 300A, 300B and 300C. The retrieved datasets can be pushed into a stack data structure for example the stack $LData as shown in 9011, 9015 and 9019.

Next, with reference to FIG. 9B, the LDM component 8000 can verify through the conditional statement 9021 if an Application Data Scheme to convert the local datasets into a High-Fidelity Format is available in local memory. As previously explained, an Application Data Scheme can be requested and provided by the vendor system, for example the Multi-Scheme/API Management server 400, as shown in block 9023 (also see FIG. 8, blocks 8007 and 8009).

The LDM component 8000 can initiate an iterative loop 9025 in which each field or element in the stack data structure $LData is converted into a field in a High Fidelity Format ($HF_SField) through the highFidelity function which can take as parameters a local dataset field ($SField) and an Application Data Scheme ($DSchm), as shown in step 9027. Additionally, each of the converted fields can be appended into a data structure, for example a $HF_SField stack, list or file as shown in step 9029. The loop initiated in step 9025 can iterate until the last local dataset element in $LData is processed; this condition can be expressed through the conditional statement shown in 9031. Once all the fields have been converted into a High Fidelity Format, the LDM component 8000 can execute the command 9033 to store the data structure $HF_Data into the High-Fidelity data set repository 700 (also see block 8011 in FIG. 8).

FIG. 10 illustrates an example of high-fidelity datasets and backup files stored in a local or remote repository. In some implementations, the LI server 100 can include a High-Fidelity Datasets Repository 700 where both SaaS data and Non-SaaS data can be stored in a High-Fidelity Format. Data converted into a High-Fidelity Format contains all the elements and metadata necessary to restore the data back to its original native format through, for example, a Reverse-HighFidelity function (e.g., shown at block 7013 in FIG. 7). Therefore, an LI server can seamlessly restore datasets, documents and/or files into SaaS and Non-SaaS applications. Moreover, when data is represented in a High-Fidelity Format, equivalent or corresponding data fields from different SaaS and Non-SaaS application can be identified. For example, equivalent fields can be obtained from an Application Data Scheme, such that, an LI server can execute Structured Query Language (SQL) operations joining or correlating equivalent fields appearing in datasets obtained from different sources, as explained in greater detail below in connection with FIG. 11.

A High Fidelity Dataset Repository 700 can store multiple datasets, documents and/or files from numerous SaaS and Non-SaaS applications. For example, with reference to FIG. 10, the repository 700 can include first SaaS datasets from a first SaaS application "SaaS_1", 10001 and second SaaS datasets from a second SaaS application "SaaS_2", 10005. Additionally, the repository 700 can store Non-SaaS datasets, for example, datasets from the Non-SaaS application "Non-SaaS_1", 10023.

The High-Fidelity Format facilitates the representation of respective elements in a dataset, document and/or files as a collection of fields, including values, tags indicating what a value represents, and/or metadata elements. For example, the SaaS document 10003 can include an identifier field, an owner field, a title field, a date field, a content field and the like fields representing values and/or metadata. Moreover, the High-Fidelity Datasets Repository 700 can keep a relation of field equivalencies between multiple native SaaS and Non-SaaS data formats. For example, the repository 700 can generate a relation record or content equivalency relation defining the equivalency between the "Owner" field 10009A in the datasets retrieved from the SaaS application 10001 and the "Owner" field 10009B in the datasets retrieved from the SaaS application 10005. The content equivalency relation can be generated utilizing multiple Application Data Schemes describing how different SaaS applications respectively organize and represent data content.

The High Fidelity Datasets Repository 700 can similarly contain backup files, snapshots and/or previous versions of datasets retrieved from multiple SaaS and Non-SaaS applications. For example, the versions or Backup Instances V1 . . . Vn shown in 10031A-C, 10033A-C and 10035A-C are retained versions of datasets, documents and/or files retrieved from the applications 10001, 10005 and 10023 respectively.

Figure 11:
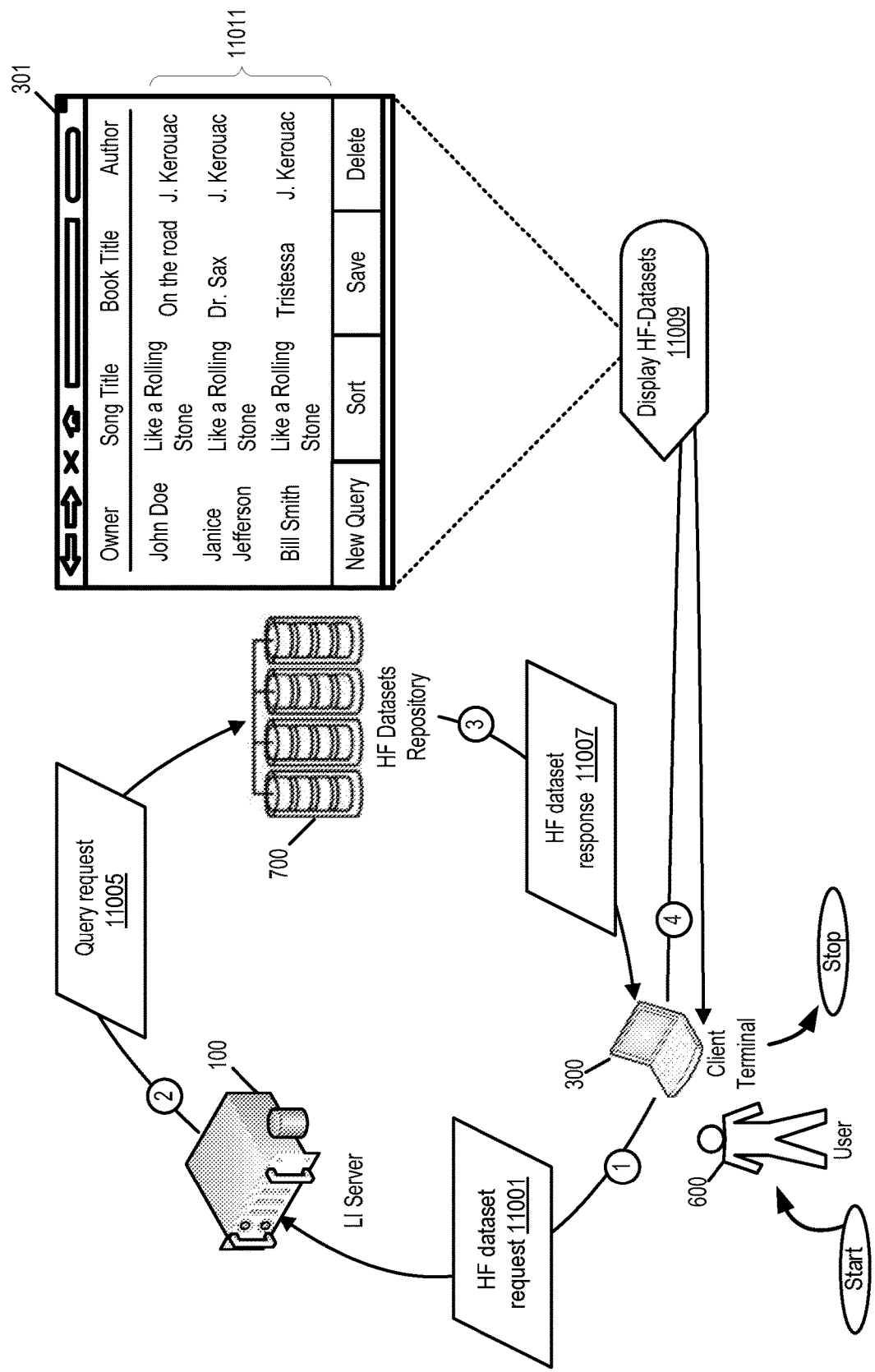
FIG. 11 illustrates an example data flow during the request and retrieval of a high fidelity dataset comprising data generated by multiple different SaaS applications, according to inventive aspects of the present disclosure.

FIG. 11 illustrates an example data flow during the request and retrieval of a high fidelity dataset comprising data generated by multiple different SaaS applications. In some implementations, the user 600 in communication with the client terminal 300, can send a high fidelity dataset request 11001. An example of a high fidelity dataset request 11001, substantially in the form of Structured Query Language (SQL), is provided below:

| | |
|---|---|
| 1. | SELECT SaaS_Music.owner, SaaS_Music.song_title, SaaS_eBooks.book_title, SaaS_eBooks.book_author |
| 2. | FROM SaaS_Music |
| 3. | INNER JOIN SaaS_eBooks |
| 4. | ON SaaS_Music.owner = SaaS_eBooks.owner; |

As shown in the SQL code, a HF dataset request 11001 can request a dataset composed by data from multiple SaaS applications. For example, the SELECT statement in line 1 specifies fields from a SaaS_Music application and a SaaS_eBooks application. The SaaS_Music can be, for example, iTunes Radio from Apple or the like music oriented SaaS applications. On the other hand, the SaaS_e-

Books can be the Amazon Kindle eBook platform. Lines 2 and 3 specify the two SaaS applications and an Inner Join relationship. An Inner Join SQL statement creates a new result dataset by combining column values of two tables or datasets (e.g., SaaS_Music datasets and SaaS_eBooks datasets) based upon the join-predicate. The query compares each row of SaaS_Music with each row of SaaS_eBooks to find all pairs of rows which satisfy the join-predicate (i.e., SaaS_Music.owner=SaaS_eBooks.owner).

Upon the reception of the request 11001, the LI server 100 can verify the syntax and parameters in the SQL statement. Thereafter, if the syntax and parameters verification shows no errors, the server 100 can send a query request 11005 to the HF Datasets Repository 700 to be processed. The repository 700 can retrieve the fields specified in the request 11005 and send the resulting dataset to the client terminal 300 in a HF dataset response 11007.

The client terminal 300, can display the resulting dataset as an output 11009 on the GUI 301. The resulting dataset 11011 is composed of three records. Each record has an owner field, a song title field, a book title field, and a book author field. Having datasets with fields derived from multiple SaaS and Non-SaaS applications can facilitate the inference of business generalizations and/or rules. As such, in some implementations, the LI server 100 can include a machine learning application to generate association rules. Association rules can be mined from the high-fidelity datasets stored in the repository 700. A machine learning application can utilize customized pattern discovery techniques and/or one or more adapted versions of pattern discovery techniques including but not limited to AIS algorithm, SETM algorithm, Apriori algorithm and the like.

In some implementations, the applied pattern discovery techniques can generate one or more association rules by identifying sets of items that have significant support in the high fidelity datasets. For example, an association rule may state: If an owner purchased, or marked as "Like" or "Favorite" the song "Like a Rolling Stone", then the owner bought a book written by Jack Kerouac. Further, the rule can be associated with a confidence value (e.g., 0.83) used to interpret the degree of confidence of the rule's consequent when the antecedent is known. Similar, rules can be inferred from the HF dataset contained in the repository 700 and the remote storage repository 800 as previously described with respect to FIG. 4.

Multi-Scheme/API Management Server and Client Terminals/Agents

Figure 12:
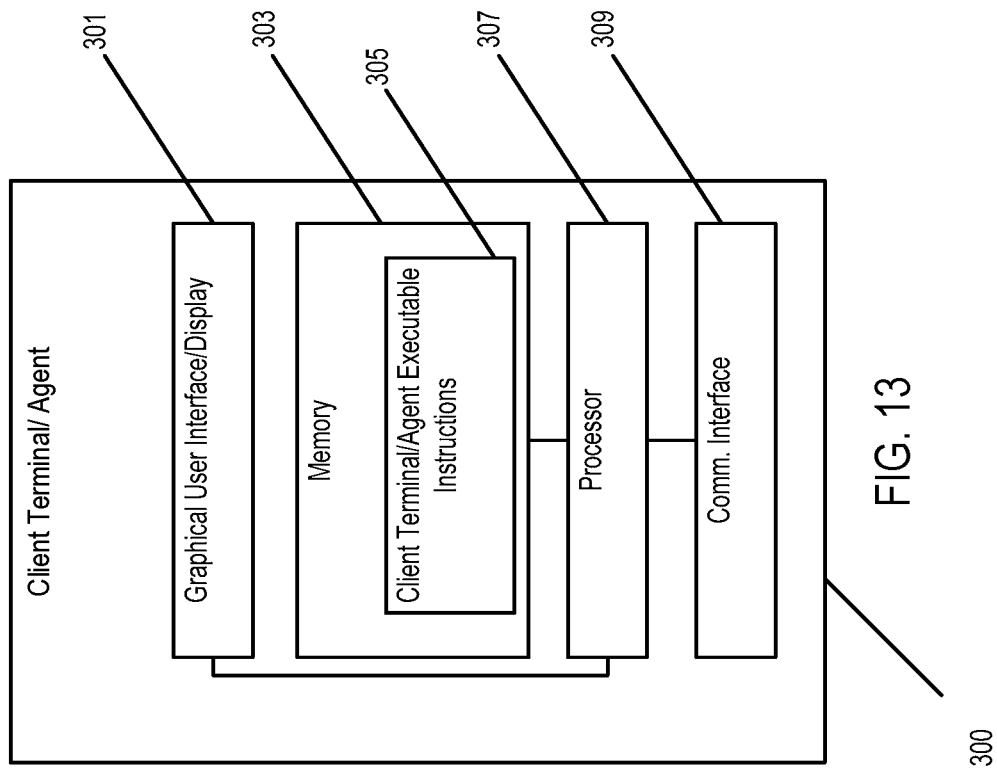
FIG. 12 shows an example of system components of the Multi-Scheme/API Management Server shown in the foregoing figures, according to inventive aspects of the present disclosure.

FIG. 12 shows an example of system components of a Multi-Scheme/API Management Server, for example, Multi-Scheme/API Management Server 400 in FIG. 2A. In one embodiment, a Multi-Scheme/API Management Server apparatus 400 can include a user interface/display and/or graphical user interface (GUI) 401 to display and receive information from a user. The user interface 401 can receive commands from a processor 407 physically and operatively coupled to a memory 403 with a set of executable instructions 405 which enables a plurality of functions performed by the apparatus 400. Examples of the instructions included in 405 are: instructions to update periodically Backup Definitions, instructions to update periodically data schemes, instructions to process Backup Definition requests, instructions to process data scheme requests and other instructions discussed in this disclosure. Additionally the apparatus 400 can include a communication interface 409 to receive and transmit data to one or more devices through the Internet and/or other computer network (e.g., transmit and receive data from an LI server 100).

Figure 13:
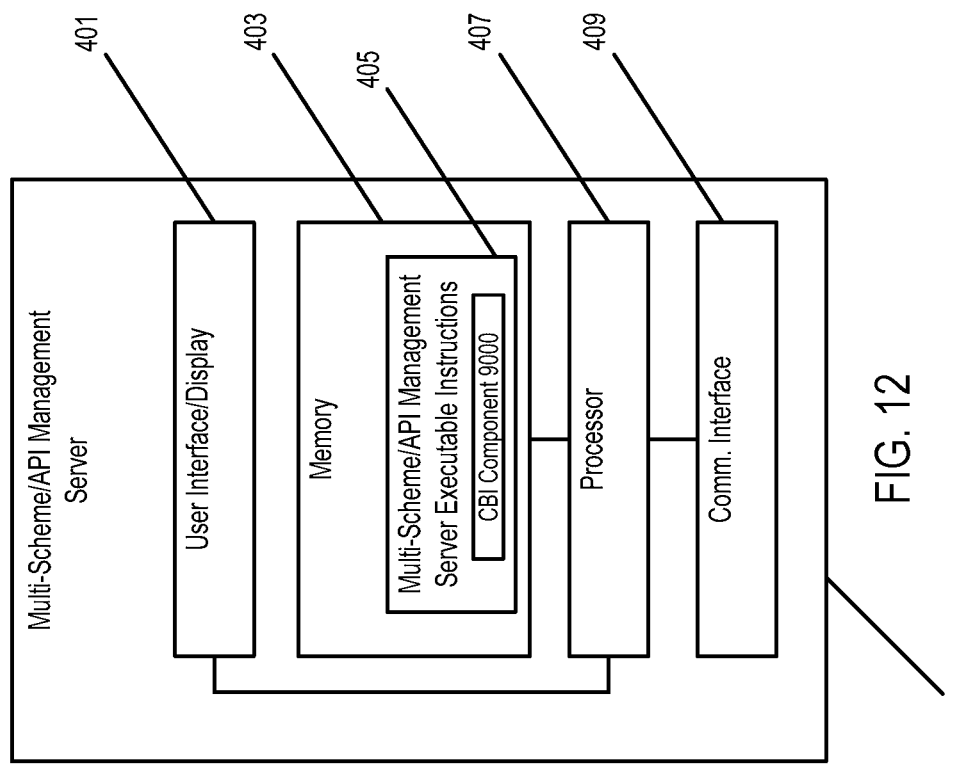
FIG. 13 shows an example of system components of the Client Terminal shown in the foregoing figures, according to inventive aspects of the present disclosure.

FIG. 13 shows an example of system components of a Client Terminal/Agent, for example, Client Terminal 300 in FIG. 1. A Client Terminal/Agent apparatus 300 can include a user interface/display 301 and/or graphical user interface (GUI) to display and receive information from a user. The user interface can receive commands from a processor 307 physically coupled to a memory 303 with a set of executable instructions 305 which enables a plurality of functions performed by the apparatus 300. Examples of the instructions included in 305 are: instructions to schedule a backup task, instructions to request a HF dataset, instructions to display a HF dataset, instructions to display multiple versions of a HF dataset and the like instructions. Additionally the apparatus 300 can include a communication interface 309 to receive and transmit data to one or more devices through the Internet and/or other computer network (e.g., transmit and receive data from an LI server 100).

LI Server Controller

Figure 14:
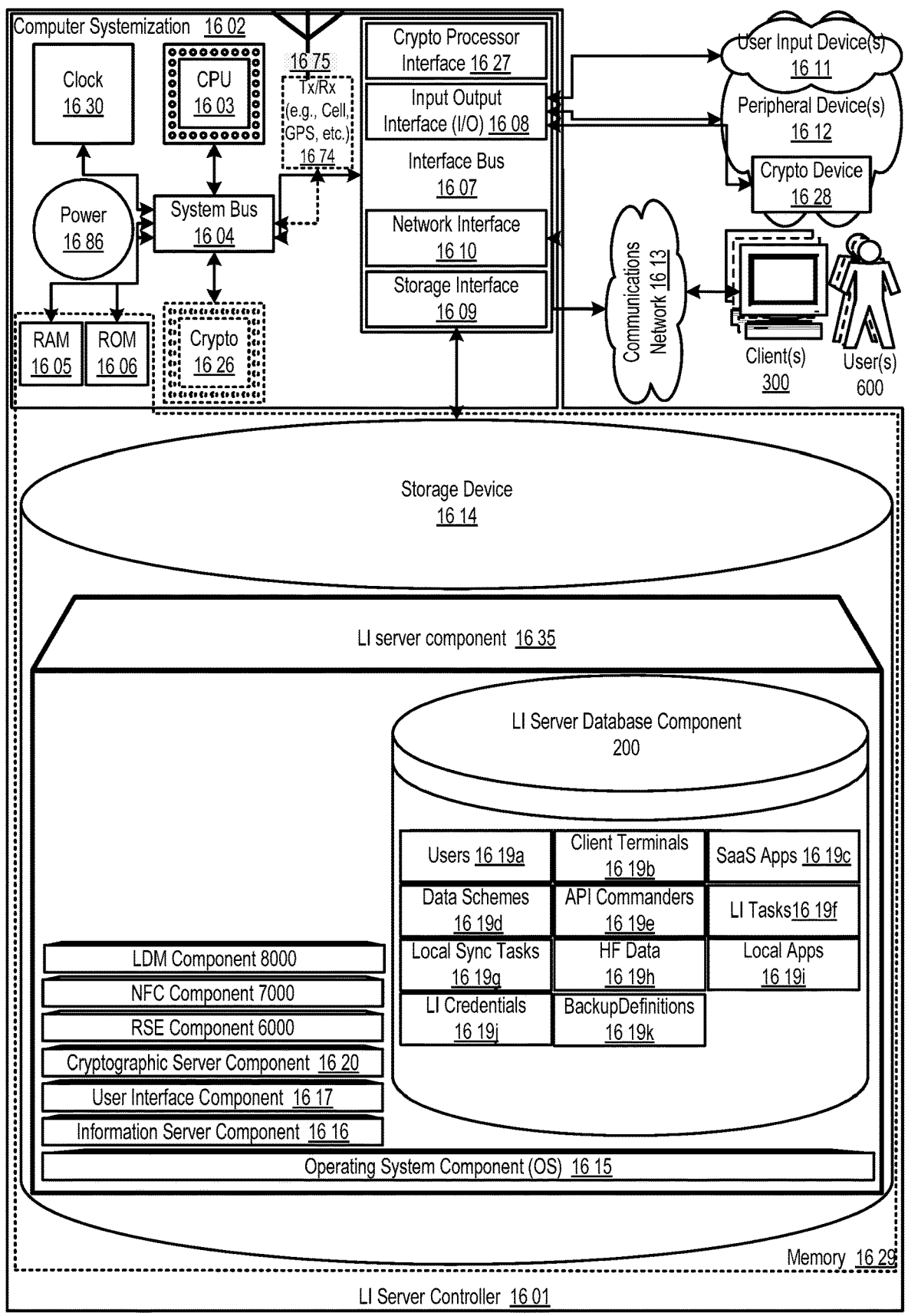
FIG. 14 shows an example block diagram illustrating an LI Server Controller of the LI Server shown in the foregoing figures, according to inventive aspects of the present disclosure.

FIG. 14 shows a block diagram illustrating embodiments of a LI server controller. In this embodiment, the LI server controller 1601 may be a component of the LI Server 100 and may serve to aggregate, process, store, search, serve, identify, instruct, generate, match, and/or facilitate interactions with a computer through various technologies, and/or other related data. The LI server controller can, for example, be configured such that the various components described herein execute on the LI server 100 (similar controllers may be implemented for the Multi-Scheme/API Management Server 400 and/or the Client Terminal/Agent 300). Because each component of the LI server controller may be distributed, as described below, in different embodiments the LI server 100, the Multi-Scheme/API Management Server 400 and/or the Client Terminal/Agent 300 may perform portions of the program logic assigned to them or portions of the program logic normally assigned to the other. In another example, the RSE Component 6000 (described above with respect to FIG. 3A and FIG. 3B), the CBI Component 9000 (described above with respect to FIG. 5), the NFC Component 7000 (described above with respect to FIG. 7) and the LDM Component 8000 (described above with respect to FIG. 9A and FIG. 9B) can execute on the LI server 100 as shown. In an alternative configuration, the RSE Component 6000, the CBI Component 9000, the NFC Component 7000 and the LDM Component 8000 may be installed on the Multi-Scheme/API Management Server 400 and provide services to the LI server 100 via the networked program execution capabilities described below.

Typically, users, which may be people and/or other computer systems, may engage information technology systems (e.g., computers) to facilitate information processing. In turn, computers employ processors to process information; such processors 1603 may comprise central processing units (CPUs), microcontrollers, microprocessors, etc. as known in the art of computers. CPUs use communicative circuits to pass binary encoded signals acting as instructions to enable various operations. These instructions may be operational and/or data instructions containing and/or referencing other instructions and data in various processor accessible and operable areas of memory 1629 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations.

One type of program is a computer operating system, which may be executed by a CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the LI server controller 1601 may be connected to and/or communicate with entities such as, but not limited to: one or more users from user input devices 1611; peripheral devices 1612; an optional cryptographic processor device 1628; and/or a communications network 1613.

The LI server controller 1601 may be based on computer systems that may comprise, but are not limited to, components such as: a computer systemization 1602 connected to memory 1629.

Networks, Servers, Nodes, and Clients

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

Computer Systemization

A computer systemization 1602 may comprise a clock 1630, central processing unit ("CPU(s)" and/or "processor(s)" (these terms are used interchangeable throughout the disclosure unless noted to the contrary)) 1603, a memory 1629 (e.g., a read only memory (ROM) 1606, a random access memory (RAM) 1605, etc.), and/or an interface bus 1607. Frequently, although not necessarily, these components are interconnected and/or communicate through a system bus 1604 on one or more (mother)board(s) 1602 having conductive and/or otherwise transportive circuit pathways through which instructions (e.g., binary encoded signals) may travel to effectuate communications, operations, storage, etc. The computer systemization may be connected to a power source 1686; e.g., optionally the power source may be internal.

Optionally, a cryptographic processor 1626 and/or transceivers (e.g., ICs) 1674 may be connected to the system bus. In another embodiment, the cryptographic processor and/or transceivers may be connected as either internal and/or external peripheral devices 1612 via the interface bus I/O. In turn, the transceivers may be connected to antenna(s) 1675, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing LI controller to determine its location)); Broadcom BCM4329FKUBG transceiver chip (e.g., providing 802.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like.

The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory beyond the processor itself; internal memory may include, but is not limited to: fast registers, various levels of cache memory (e.g., level 1, 2, 3, etc.), RAM, ROM, etc.

The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded, and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the LI server controller and beyond through various interfaces. Should processing requirements dictate a greater amount speed and/or capacity, distributed processors (e.g., Distributed LI), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, the technology disclosed herein may be implemented with a microcontroller such as CAST's R8051XC2 microcontroller; Intel's MCS 51 (i.e., 8051 microcontroller); and/or the like. Also, to implement certain features of the disclosed technology, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the LI component collection (distributed or otherwise) and/or features may be implemented via the microprocessor and/or via embedded components; e.g., via ASIC, coprocessor, DSP, FPGA, and/or the like. Alternately, some implementations of the LI may be implemented with embedded components that are configured and used to achieve a variety of features or signal processing.

Depending on the particular implementation, the embedded components may include software solutions, hardware solutions, and/or some combination of both hardware/software solutions. For example, LI features disclosed herein may be achieved through implementing FPGAs, which are a semiconductor devices containing programmable logic components called "logic blocks", and programmable interconnects, such as the high performance FPGA Virtex series and/or the Spartan series manufactured by Xilinx. Logic blocks and interconnects can be programmed by the customer or designer, after the FPGA is manufactured, to implement any of the LI features. A hierarchy of programmable interconnects allow logic blocks to be interconnected as needed by the LI system designer/administrator, somewhat like a one-chip programmable breadboard. An FPGA's logic blocks can be programmed to perform the operation of basic logic gates such as AND, and XOR, or more complex combinational operators such as decoders or mathematical operations. In at least some FPGAs, the logic blocks also include memory elements, which may be circuit flip-flops or more complete blocks of memory. In some circumstances, the LI may be developed on regular FPGAs and then migrated into a fixed version that more resembles ASIC implementations. Alternate or coordinating implementations may migrate LI server controller features to a final ASIC instead of or in addition to FPGAs. Depending on the implementation all of the aforementioned embedded components and microprocessors may be considered the "CPU" and/or "processor" for the LI.

Power Source

The power source 1686 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1686 is connected to at least one of the interconnected subsequent components of the LI thereby providing an electric current to all subsequent components. In one example, the power source 1686 is connected to the system bus component 1604. In an alternative embodiment, an outside power source 1686 is provided through a connection across the I/O interface 1608. For example, a universal serial bus (USB) and/or IEEE 1394 connection carries both data and power across the connection and is therefore a suitable source of power.

Interfaces and Interface Adapters

Interface bus(ses) 1607 may accept, connect, and/or communicate to a number of interface adapters, conventionally although not necessarily in the form of adapter cards, such as but not limited to: input output (I/O) interfaces 1608, storage interfaces 1609, network interfaces 1610, and/or the like. Optionally, cryptographic processor interfaces 1627 similarly may be connected to the interface bus 1607. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1609 may accept, communicate, and/or connect to a number of storage devices such as, but not limited to: storage devices 1614, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 1610 may accept, communicate, and/or connect to a communications network 1613. Through a communications network 1613, the LI server controller is accessible through remote clients 1633b (e.g., computers with web browsers) by users 1633a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed LI), architectures may similarly be employed to pool, load balance, and/or otherwise increase the communicative bandwidth required by the LI server controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 1610 may be used to engage with various communications network types 1613. For example, multiple network interfaces may be employed to allow for the communication over broadcast, multicast, and/or unicast networks.

Input Output interfaces (I/O) 1608 may accept, communicate, and/or connect to user input devices 1611, peripheral devices 1612, cryptographic processor devices 1628, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like.

One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 1611 may include peripheral devices, such as: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 1612 may be connected and/or communicate to I/O and/or other facilities of the like such as network interfaces, storage interfaces, directly to the interface bus, system bus, the CPU, and/or the like. Peripheral devices may be external, internal and/or part of the LI server controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the LI server controller may be embodied as an embedded, dedicated, and/or monitor-less (i.e., headless) device, wherein access would be provided over a network interface connection.

Cryptographic units such as, but not limited to, microcontrollers, processors 1626, interfaces 1627, and/or devices 1628 may be attached, and/or communicate with the LI server controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 1629. However, memory is a fungible technology and resource, thus, any number of memory embodiments may be employed in lieu of or in concert with one another. It is to be understood that the LI server controller and/or a computer systemization may employ various forms of memory 1629. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 1629 will include ROM 1606, RAM 1605, and a storage device 1614. A storage device 1614 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 1629 may contain a collection of program and/or database components and/or data such as, but not limited to: operating system component 1615; information server component 1616; user interface component 1617; LI database component 1619; cryptographic server component 1620; add components here; and/or the like (i.e., collectively a component collection). The aforementioned components may be incorporated into (e.g., be sub-components of), loaded from, loaded by, or otherwise operatively available to and from the LI component(s) 1635.

Any component may be stored and accessed from the storage devices and/or from storage devices accessible through an interface bus. Although program components such as those in the component collection, typically, are stored in a local storage device 1614, they may also be loaded and/or stored in other memory such as: remote "cloud" storage facilities accessible through a communications network; integrated ROM memory; via an FPGA or ASIC implementing component logic; and/or the like.

Operating System Component

The operating system component 1615 is an executable program component facilitating the operation of the LI server controller. Typically, the operating system facilitates access of I/O, network interfaces, peripheral devices, storage devices, and/or the like. The operating system may be a highly fault tolerant, scalable, and secure system such as: Unix and Unix-like system distributions (such as AT&T's UNIX; Berkley Software Distribution (BSD) variations such as FreeBSD, NetBSD, OpenBSD, and/or the like; Linux distributions such as Red Hat, Debian, Ubuntu, and/or the like); and/or the like operating systems. However, more limited and/or less secure operating systems also may be employed such as Apple OS-X, Microsoft Windows 2000/ 2003/3.1/95/98/CE/Millenium/NT/Vista/XP/Win7 (Server), and/or the like.

An operating system may communicate to and/or with other components in a component collection, including itself, and/or the like. The operating system can communicate with other program components, user interfaces, and/or the like. The operating system, once executed by the CPU, may enable the interaction with communications networks, data, I/O, peripheral devices, program components, memory, user input devices, and/or the like. The operating system may provide communications protocols that allow the LI server controller to communicate with other entities through a communications network 1613. Various communication protocols may be used by the LI server controller as a subcarrier transport mechanism for interaction, such as, but not limited to: multicast, TCP/IP, UDP, unicast, and/or the like.

Information Server Component

An information server component 1616 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., ICQ, Internet Relay Chat (IRC), Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Representational State Transfer (REST), Simple Object Access Protocol (SOAP), Remote Procedure Call (RPC) and/or the like.

The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the LI server controller based on the remainder of the HTTP request. For example, a request such as http:// 123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the LI database component 1619, operating system component 1615, other program components, user interfaces, and/or the like.

Access from the Information Server Component 1616 to the LI database component 1619 may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the LI. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the LI as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser. Also, an information server may contain, communicate, generate, obtain, and/or provide program component, system, user, and/or data communications, requests, and/or responses.

User Interface Component

Computer interaction interface elements such as check boxes, cursors, menus, scrollers, and windows (collectively and commonly referred to as widgets) facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows, web interface libraries such as, but not limited to, Dojo, jQuery UI, MooTools, Prototype, script.aculo.us, SWFObject, Yahoo! User Interface, any of which may be used and provide a baseline and means of accessing and displaying information graphically to users.

A user interface component 1617 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating system component 1615, other program components, and/or the like. The user interface may contain, communicate, generate, obtain, and/or provide program component, system, user, and/or data communications, requests, and/or responses.

Cryptographic Server Component

A cryptographic server component 1620 is a stored program component that is executed by a CPU 1603, cryptographic processor 1626, cryptographic processor interface 1627, cryptographic processor device 1628, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component can facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael (AES), RSA, Secure Hash Algorithm (SHA), Secure Socket Layer (SSL), Secure Hypertext Transfer Protocol (HTTPS), and/or the like.

Employing such encryption security protocols, the LI may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for a digital audio file. A cryptographic component may communicate to and/or with other components in a component collection, including itself, and/or facilities of the like. The cryptographic component supports encryption schemes allowing for the secure transmission of information across a communications network to enable the LI component to engage in secure transactions if so desired. The cryptographic component facilitates the secure accessing of resources on the LI and facilitates the access of secured resources on remote systems; i.e., it may act as a client and/or server of secured resources. Most frequently, the cryptographic component communicates with information server component 1616, operating system component 1615, other program components, and/or the like. The cryptographic component may contain, communicate, generate, obtain, and/or provide program component, system, user, and/or data communications, requests, and/or responses.

LI Database Component

The LI database component 1619 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the LI database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 1619 includes several tables 1619*a-k*. A Users table 1619*a* may include fields such as, but not limited to: user_id, first_name, last_name, age, state, address_firstline, address_secondline, zipcode, devices_list, contact_info, contact_type, alt_contact_info, alt_contact_type, and/or the like. A Client Terminals table 1619*b* may include fields such as, but not limited to: client_id, client_name, client_ip, client_type, client_model, operating_system, os_version, app_installed_flag, and/or the like. A SaaS Apps table 1619*c* may include fields such as, but not limited to: app_id, app_name, app_role, app_capabilities, app_server_IP_address, and/or the like. The Data Schemes table 1419*d* may include fields such as, but not limited to: scheme_id, scheme_app, scheme_type, scheme_fields, scheme_metadataFields and/or the like. The API commanders table 1419*e* may include fields such as, but not limited to: APIcmd_id, APIcmd_appID, APIcmd_type, API_cmdTriggerFields and the like. The LI tasks table 1419*f* may include fields such as, but not limited to: task_id, task_owner, task_script, task_schedule, task_relatedApp and the like. The Local Sync Tasks table 1419*g* may include fields such as, but not limited to: task_id, task_owner, task_script, task_schedule, task_relatetClientID and the like. The HF data table 1419*h* may include fields such as, but not limited to: HF_appID, HF_fileID, HF_fieldid, HF_versionID and the like. The local apps table 1419*i* may include fields such as, but not limited to: lapp_appID, lapp_vendor, lapp_description and the like. The LI credentials table 1419*j* may include fields such as, but not limited to: cred_appID, cred_secretKey, cred_CAID and the like. The BackupDefinitions table 1419*k* may include fields such as, but not limited to: bd_bdID, bd_appID, bd_APIcmdID, bd_schemeID, bd_version and the like. Any of the aforementioned tables may support and/or track multiple entities, accounts, users and/or the like.

In one embodiment, the LI database component may interact with other database systems. For example, when employing a distributed database system. In such an embodiment, queries and data access by any LI component may treat the combination of the LI database component results and results from a second segment in a distributed database system as an integrated database layer. Such a database layer may be accessed as a single database entity, for example through LI database component 1619, by any LI component.

In one embodiment, user programs may contain various user interface primitives, which may serve to update the LI. Also, various accounts may require custom database tables depending upon the environments and the types of clients the LI may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 1619a-k. The LI may be configured to keep track of various settings, inputs, and parameters via database controllers.

The LI database may communicate to and/or with other components in a component collection, including itself, and/or facilities of the like. Most frequently, the LI database communicates with the LI component, other program components, and/or the like. The database may contain, retain, and provide information regarding other nodes and data.

LI Component

The LI component 1635 is a stored program component that is executed by a CPU. In one embodiment, the LI component incorporates any and/or all combinations of the aspects of the LI that was discussed in the previous figures. As such, the LI affects accessing, obtaining and the provision of information, services, transactions, and/or the like across various communications networks. The features and embodiments of the LI discussed herein increase network efficiency by reducing data transfer requirements the use of more efficient data structures and mechanisms for their transfer and storage. As a consequence, more data may be transferred in less time, and latencies with regard to data processing operations and transactions, are also reduced. In many cases, such reduction in storage, transfer time, bandwidth requirements, latencies, etc., will reduce the capacity and structural infrastructure requirements to support the LI's features and facilities, and in many cases reduce the costs, energy consumption/requirements, and extend the life of LI's underlying infrastructure; this has the added benefit of making the LI more reliable. Similarly, many of the features and mechanisms are designed to be easier for users to use and access, thereby broadening the audience that may enjoy/employ and exploit the feature sets of the LI; such ease of use also helps to increase the reliability of the LI. In addition, the feature sets include heightened security as noted via the Cryptographic components 1620, 1626, 1628 and throughout, making access to the features and data more reliable and secure.

The LI component may transform datasets ingested via a local server e.g., LI server 100 and/or via a cloud based server e.g., Multi-Scheme/API Management server 400. In some embodiments, the datasets can be ingested from divergent sources for example applications installed in a local area network, applications installed in a client terminal e.g., client terminal 30000 and/or applications running in a Software as a Service Server e.g., SaaS server 500. In some embodiments, the datasets can be ingested periodically to produce a body of backups derived from SaaS and Non-SaaS applications. Moreover the ingested datasets can be further transformed into a canonical form or High Fidelity Format in order to produce big datasets that can be analyzed to reveal data patterns, trends, and associations related to relevant transactions of an enterprise. In some embodiments, the LI component 1635 takes inputs (e.g., SaaS application backup request 1001, Store new SaaS LI task request 1003, Communication access identifier (CAID) and key request 1007, Login SaaS application request 1019, SaaS application backup request 1021, BackupDefinition request 2007, LI task request 2003, SaaS dataset request 2011, LI data request 2025, Store HF-SaaS dataset request 2021, LI data request 4007, Store HF-SaaS dataset request 4013, SaaS dataset versions request 6001, SaaS data version query request 6003A and 6003B, restore SaaS data version request 6011, restore native SaaS data request 6015, local application data scheme request 8007, local datasets 8002, 8003 and 8005, HF dataset request 11001, query request 1105, LI request 12007, SaaS and Non-SaaS data request 12013 and 12027 and/or the like) etc., and transforms the inputs via various components (e.g., the RSE Component 6000, the NFC Component 7000, the LDM Component 8000, the CBI Component 9000, IVMDK Component 10000 and/or the like), into outputs (e.g., Store new SaaS LI task response 1005, CAID and Key response 1009, Store new SaaS LI task response 1015, code to load a login application 1017, Login to SaaS application response 1023, BackupDefinition response 2009, LI task response 2005, LI data response 2027, SaaS dataset response 2013, Store HF-SaaS dataset response 2023, Store HF-SaaS dataset response 4015, LI data response 4009, SaaS dataset version (DV) response 6005, restore SaaS data version response 6017, local application data scheme response 8009, HF-dataset response 11007, LI data response 12009, SaaS or Non-SaaS high fidelity response 12015, SaaS and Non-SaaS data response 12029 and/or the like).

The LI component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery; jQuery UI; MooTools; Prototype; script.aculo.us; Simple Object Access Protocol (SOAP); SWFObject; Yahoo! User Interface; and/or the like), WebObjects, and/or the like. In one embodiment, the LI server employs a cryptographic server to encrypt and decrypt communications. The LI component may communicate to and/or with other components in a component collection, including itself, and/or facilities of the like. Most frequently, the LI component communicates with the LI database component 1619, operating system component 1615, other program components, and/or the like. The LI may contain, communicate, generate, obtain, and/or provide program component, system, user, and/or data communications, requests, and/or responses.

Distributed LI Components

The structure and/or operation of any of the LI node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the LI server controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, Representational State Transfer (REST), process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. Further, the parsing grammar may be used beyond message parsing, but may also be used to parse: databases, data collections, data stores, structured data, and/or the like. Again, the desired configuration will depend upon the context, environment, and requirements of system deployment.

CONCLUSION

In order to address various issues and advance the art, the entirety of this application (including the Cover Page, Title, Headings, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented to assist in understanding and teach the claimed principles.

It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

Various inventive concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently claimed. Applicant reserves all rights in those unclaimed innovations including the right to claim such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method to execute a local ingestion of Software as a Service (SaaS) user data, the method comprising:
   receiving, at a local ingestion server, a Saas data backup request, wherein the Saas data backup request comprises a set of user authentication credentials to connect to a first Saas application and a schedule indicating when to execute the local ingestion of first Saas user data generated by the first Saas application;
   acquiring, from a secure cloud-based server, a first backup definition for the first Saas application identified in the Saas data backup request, the acquiring comprising:
      acquiring an application programming interface (API) tree structure and trigger fields to connect to the endpoint of the first Saas application, and
      acquiring a first data scheme comprising a set of rules describing a systematic arrangement to convert data from the first Saas application into a high fidelity format;
   executing a first local ingestion of the first Saas user data stored in a first remote server hosting the first Saas application, the first local ingestion comprising:
      connecting to an endpoint of the first Saas application specified in the first backup definition; and
      retrieving an instance of the first Saas user data from the endpoint of the first Saas application; and
      generating a first backup file of the instance of the first Saas user data.

2. The method of claim 1, wherein acquiring, from the secure cloud-based server, the first backup definition for the first Saas application identified in the Saas data backup request further comprises:
   acquiring a set of computer processor executable instructions to perform a Saas application variable mapping utilizing user-specific and local ingestion server-specific variable values.

3. The method of claim 1, wherein connecting to the endpoint of the first Saas application specified in the first backup definition further comprises:
    transmitting to the remote server hosting the first Saas application, a set of server authentication credentials of the local ingestion server; and
    transmitting to the remote server hosting the first Saas application, the set of user authentication credentials to connect to the first Saas application on behalf of the user.

4. The method of claim 1, wherein retrieving the instance of the first Saas user data from the endpoint of the first Saas application further comprises:
    executing, at the local ingestion server, an API routine with at least one trigger field value associated with the user.

5. The method of claim 1, further comprising:
    replicating the generated backup instance to a remote repository.

6. The method of claim 1, further comprising:
    acquiring, from the secure cloud-based server, a second backup definition for a second Saas application identified in the Saas data backup request;
    executing a second local ingestion of second Saas user data stored in a second remote server hosting the second Saas application, the second local ingestion comprising:
        connecting to an endpoint of the second Saas application specified in the second backup definition; and
        retrieving an instance of the second Saas user data from the endpoint of the second Saas application; and
        generating a second backup file of the instance of the second Saas user data.

7. The method of claim 6, further comprising:
    converting the instance of the first Saas user data into a first converted dataset represented in a high fidelity format utilizing a first data scheme of the first backup definition, wherein the first converted dataset comprises at least one first metadata value to reverse the first converted dataset into a first native format of the first Saas application.

8. The method of claim 7, further comprising:
    converting the instance of the second Saas user data to a second converted dataset represented in the high fidelity format utilizing a second data scheme of the second backup definition, wherein the second converted dataset comprises at least one second metadata value to reverse the second converted dataset into a second native format of the second Saas application.

9. The method of claim 8, further comprising:
    generating, at the local ingestion server, at least one content correlation between the first converted dataset and the second converted dataset based on a content equivalency rule specified in at least one of the first and second data schemes.

10. The method of claim 7, further comprising:
    receiving at the local ingestion server, a request to restore the instance of the first Saas user data;
    generating a copy of the instance of the first Saas user data in the first native format of the first Saas application based on the first converted dataset and the at least one first metadata value comprised in the first converted dataset;
    connecting to the endpoint of the first Saas application specified in the API tree structure; and
    restoring the generated copy of the instance of the first Saas user data in the first native format of the first Saas application via the endpoint of the first Saas application.

11. A local ingestor of Software as a Service (SaaS) user data apparatus, comprising:
    a memory to store processor-executable instructions; and
    at least one processor, operably coupled to the memory, and configured to issue a plurality of processing instructions stored in the memory, wherein the at least one processor issues instructions to:
        receive a Saas data backup request comprising a set of user authentication credentials to connect to a first Saas application a schedule indicating when to execute the local ingestion of first Saas user data generated by the first Saas application;
        acquire, from a secure cloud-based server, a first backup definition for the first Saas application identified in the Saas data backup request, wherein acquire comprises:
            acquire an application programming interface (API) tree structure and trigger fields to connect to the endpoint of the first Saas application, and
            acquire a first data scheme comprising a set of rules describing a systematic arrangement to convert data from the first Saas application into a high fidelity format;
        execute a first local ingestion of the first Saas user data stored in a first remote server hosting the first Saas application, the first local ingestion comprising:
        connect to an endpoint of the first Saas application specified in the first backup definition; and
        retrieve an instance of the first Saas user data from the endpoint of the first Saas application; and
        generate a first backup file of the instance of the first Saas user data.

12. The apparatus of claim 11, wherein acquire, from the secure cloud-based server, the first backup definition for the first Saas application identified in the Saas data backup request further comprises:
    acquire a set of computer processor executable instructions to perform a Saas application variable mapping utilizing user-specific and local ingestion server-specific variable values.

13. The apparatus of claim 11, wherein connect to an endpoint of the first Saas application specified in the first backup definition further comprises:
    transmit to the remote server hosting the first Saas application, a set of server authentication credentials of the local ingestion server; and
    transmit to the remote server hosting the first Saas application, the set of user authentication credentials to connect to the first Saas application.

14. The apparatus of claim 11, wherein retrieve the instance of the first Saas user data from the endpoint of the first Saas application further comprises:
    execute, an API routine with at least one trigger field value associated with the user.

15. The apparatus of claim 11, wherein the at least one processor issues further instructions to:
    replicate the generated backup instance to a remote repository.

16. The apparatus of claim 11, wherein the processor issues further instructions to:
    acquire, from the secure cloud-based server, a second backup definition for a second Saas application identified in the Saas data backup request;

execute a second local ingestion of second Saas user data stored in a second remote server hosting the second Saas application, wherein execute the second local ingestion comprises:
- connect to an endpoint of the second Saas application specified in the second backup definition; and
- retrieve an instance of the second Saas user data from the endpoint of the second Saas application; and
- generate a second backup file of the instance of the second Saas user data.

17. The apparatus of claim 16, wherein the processor issues further instructions to:
- convert the instance of the first Saas user data into a first converted dataset represented in a high fidelity format utilizing a first data scheme in the first backup definition, wherein the first converted dataset comprises at least one first metadata value to reverse the first converted dataset into a first native format of the first Saas application.

18. The apparatus of claim 17, wherein the processor issues further instructions to:
- convert the instance of the second Saas user data to a second converted dataset represented in the high fidelity format utilizing a second data scheme of the second backup definition, wherein the second converted dataset comprises at least one second metadata value to reverse the second converted dataset into a second native format of the second Saas application.

19. The apparatus of claim 18, wherein the processor issues further instructions to:
- generate at least one content correlation between the first converted dataset and the second converted dataset based on a content equivalency rule specified in at least one of the first and second data schemes.

20. The apparatus of claim 17, wherein the processor issues further instructions to:
- receive at the local ingestion server, a request to restore the instance of the first Saas user data;
- generate a copy of the instance of the first Saas user data in the first native format of the first Saas application based on the first converted dataset and the at least one first metadata value comprised in the first converted dataset;
- connect to the endpoint of the first Saas application specified in the API tree structure; and
- restore the generated copy of the instance of the first Saas user data in the first native format of the first Saas application via the endpoint of the first Saas application.

21. A method for ingesting, aggregating and securing user data from a software as a service (Saas) provider, the method comprising:
- creating, at a cloud-based server, a unique user encryption key;
- receiving, from a local ingestion server, Saas authentication credentials of the user;
- establishing a connection between the cloud-based server and a Saas server, wherein the cloud-based server is recognized by the Saas server as an authorized proxy of the user based on the Saas authentication credentials of the user;
- retrieving, from the Saas server, a dataset logically linked to the Saas authentication credentials of the user;
- encrypting the dataset with the unique user encryption key;
- storing the encrypted dataset in a cloud-based server storage device; and
- replicating the encrypted dataset to a user local storage device.

22. An ingestion, aggregation and security apparatus for a user Software as a Service (SaaS) data, comprising:
- a memory to store processor-executable instructions; and
- at least one processor, operably coupled to the memory, and configured to issue a plurality of processing instructions stored in the memory, wherein the at least one processor issues instructions to:
  - create a unique user encryption key;
  - receive, from a local ingestion server, Saas authentication credentials of the user;
  - establish a connection with a Saas server, wherein the Saas server recognizes the apparatus as an authorized proxy of the user based on the Saas authentication credentials of the user;
  - retrieve, from the Saas server, a dataset logically linked to the Saas authentication credentials of the user;
  - encrypting the dataset with the unique user encryption key;
  - storing the encrypted dataset in a cloud-based server storage device; and
  - replicating the encrypted dataset to a user local storage device.

* * * * *